(12) United States Patent
Traversa

(10) Patent No.: US 12,394,009 B2
(45) Date of Patent: Aug. 19, 2025

(54) MEMORY GRAPHICS PROCESSING UNIT

(71) Applicant: MemComputing, Inc., San Diego, CA (US)

(72) Inventor: Fabio Lorenzo Traversa, San Diego, CA (US)

(73) Assignee: MemComputing, Inc., San Diego, CA (US)

(*) Notice: Subject to any disclaimer, the term of this patent is extended or adjusted under 35 U.S.C. 154(b) by 115 days.

(21) Appl. No.: 17/804,002

(22) Filed: May 25, 2022

(65) Prior Publication Data
US 2022/0383446 A1 Dec. 1, 2022

Related U.S. Application Data

(60) Provisional application No. 63/194,429, filed on May 28, 2021.

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 6,209,017 B1* | 3/2001 | Lim | G06F 7/57 708/551 |
| 6,757,761 B1 | 6/2004 | Smith et al. | |
| 2002/0021826 A1* | 2/2002 | Okuda | H04N 7/012 348/E5.065 |
| 2003/0222860 A1* | 12/2003 | Yamaura | G06T 1/20 345/204 |
| 2004/0078093 A1* | 4/2004 | Fujii | G06F 15/8007 700/5 |
| 2004/0080999 A1* | 4/2004 | Madurawe | H01L 21/8221 257/E27.081 |
| 2007/0118721 A1* | 5/2007 | Stewart | G06F 15/8015 712/15 |
| 2007/0159488 A1 | 7/2007 | Danskin et al. | |
| 2007/0195099 A1 | 8/2007 | Diard et al. | |
| 2007/0233774 A1 | 10/2007 | Tang et al. | |
| 2009/0097771 A1 | 4/2009 | Jiang et al. | |
| 2011/0142303 A1* | 6/2011 | Mathew | G06T 7/11 382/128 |

(Continued)

OTHER PUBLICATIONS

International Search Report and Written Opinion in Application No. PCT/US22/30886, date of mailing Dec. 7, 2022.

*Primary Examiner* — Anh-Tuan V Nguyen
(74) *Attorney, Agent, or Firm* — Knobbe, Martens, Olson & Bear, LLP

(57) ABSTRACT

Memory graphics processing units (GPUs) are provided. In one aspect, a GPU for massive parallel processing of at least part of an image includes a plurality of pixel processing cores, each of the pixel processing cores configured to process a pixel of the image, and each of the pixel processing cores comprising a plurality of bit processing cores each configured to process a bit of the image and a plurality of address lines configured to provide access to the bit processing cores. The pixel processing cores are configured to process pixels of the image in parallel.

21 Claims, 38 Drawing Sheets

(56) References Cited

U.S. PATENT DOCUMENTS

| | | |
|---|---|---|
| 2011/0227920 A1* | 9/2011 | Adams .................. G06T 15/005 |
| | | 345/426 |
| 2012/0200580 A1 | 8/2012 | Gnanasambandam et al. |
| 2013/0336587 A1* | 12/2013 | Lee ........................... G06T 7/11 |
| | | 382/173 |
| 2016/0378715 A1* | 12/2016 | Kang .................. G06F 15/8061 |
| | | 712/2 |
| 2017/0148371 A1* | 5/2017 | Qian ......................... G06T 1/20 |
| 2017/0242797 A1* | 8/2017 | Wang .................. G06F 12/0817 |
| 2017/0262291 A1 | 9/2017 | Lai et al. |
| 2019/0303518 A1* | 10/2019 | Drego ................. G06F 12/1027 |
| 2020/0082246 A1* | 3/2020 | Shao ...................... G06N 3/048 |
| 2021/0342277 A1* | 11/2021 | Borgonovo ............. G06F 7/523 |
| 2022/0100813 A1* | 3/2022 | Lagudu .................. G06F 17/16 |

* cited by examiner

-- Prior Art --

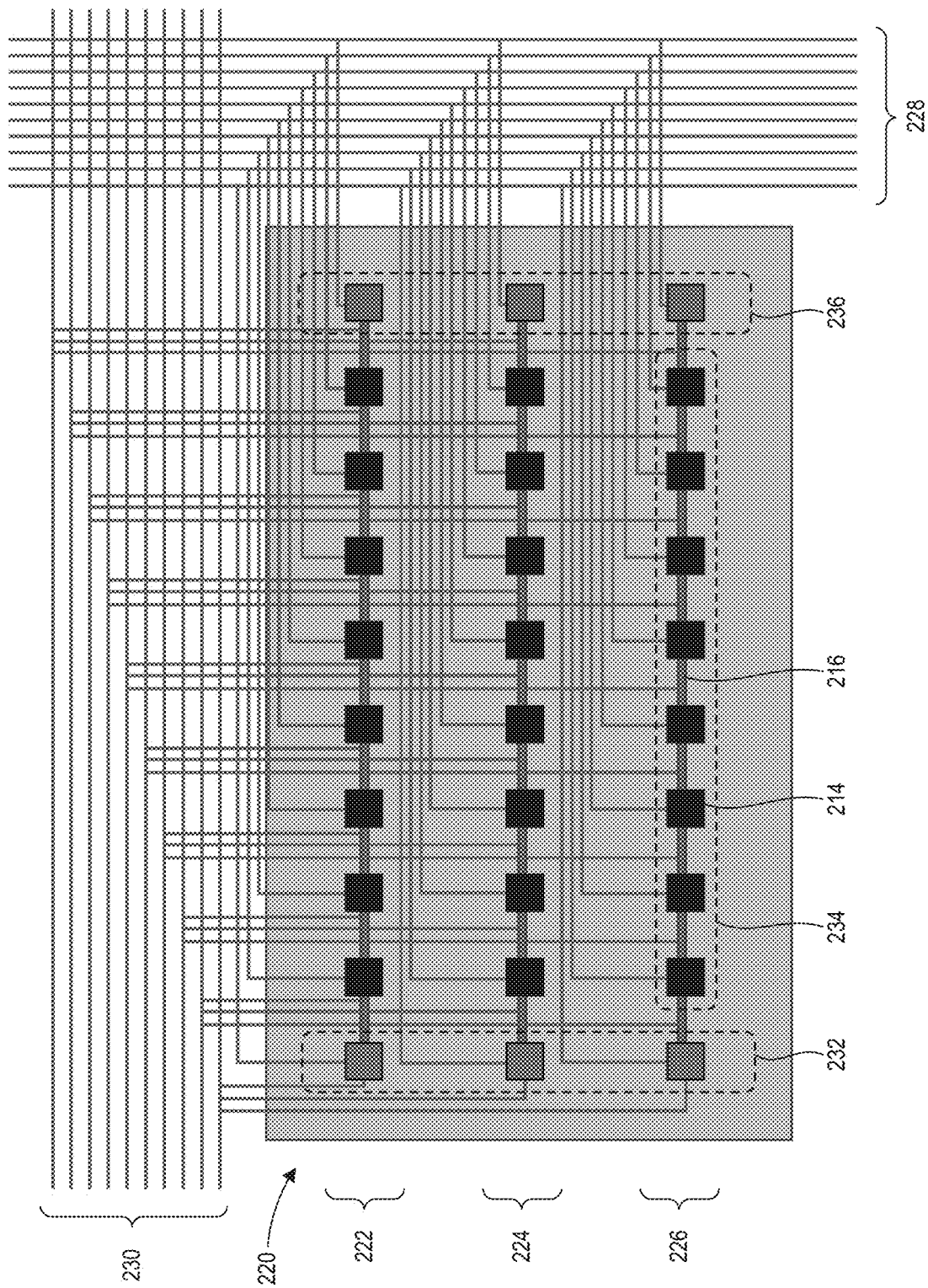

302 →

State evolution rule

| $c_1$ | $c_2$ | → | $c_2$ |
|---|---|---|---|
| 0 | 0 | → | 0 |
| 1 | 0 | → | 1 |
| 0 | 1 | → | 1 |
| 1 | 1 | → | 2 |

State evolution rule

| $S_{2,j-1}$ | $c_{2,j}$ | → | $S_{2,j}$ | $c'_{2,j}$ |
|---|---|---|---|---|
| 0 | 0,1 | → | 0 | 0,1 |
| 1 | 0 | → | 0 | 1 |
| 0 | 2 | → | 1 | 0 |
| 1 | 1,2 | → | 1 | 0,1 |

| $M_1$ | $M_2$ | F | → | F |
|---|---|---|---|---|
| 0 | 0 | 0 | → | 0 |
| 1 | 0 | 0 | → | 1 |
| 0 | 1 | 0 | → | 0 |
| 1 | 1 | 0 | → | 1 |

606

$$\begin{array}{ccccc} M_1 & M_2 & F & \to & F \\ 0 & 0 & 0 & \to & 0 \\ 1 & 0 & 1 & \to & 1 \\ 0 & 1 & 0 & \to & 1 \\ 1 & 1 & 1 & \to & 0 \end{array}$$

610 →

| $M_1$ | $M_2$ | F | → | $M_2$ |
|---|---|---|---|---|
| 0 | 0 | 0 | → | 0 |
| 1 | 0 | 1 | → | 1 |
| 0 | 1 | 1 | → | 1 |
| 1 | 1 | 0 | → | 1 |

614 ⤴

$$\begin{array}{cccc} M_1 & M_2 & F \to & F \\ 0 & 0 & 0 \to & 0 \\ 1 & 1 & 1 \to & 0 \\ 0 & 1 & 1 \to & 0 \\ 1 & 1 & 0 \to & 1 \end{array}$$

MEMORY GRAPHICS PROCESSING UNIT

CROSS REFERENCE TO ANY PRIORITY APPLICATIONS

Any and all applications for which a foreign or domestic priority claim is identified in the Application Data Sheet as filed with the present application are hereby incorporated by reference under 37 CFR 1.57. The present application claims the benefit of priority of U.S. Provisional Patent Application No. 63/194,429, filed May 28, 2021 and titled "GRAPHICS PROCESSING MEMORY UNIT," the disclosure of which is hereby incorporated in its entirety and for all purposes.

TECHNICAL FIELD

The present disclosure relates generally to graphics processing memory units. More particularly, the present disclosure is related to systems and methods for a specialized graphics processing unit (GPU) that can process images with significantly less movement of data.

DESCRIPTION OF THE RELATED TECHNOLOGY

Graphics processing units (GPUs) are specialized electronic circuits typically designed to process image data intended for output to a display device. Although GPUs are designed to be specialized for the processing of image data, they may include "general purpose" processors which can also be programmed to perform computations which can be used outside of the field of image processing.

SUMMARY OF CERTAIN INVENTIVE ASPECTS

Embodiments of the invention relate to a memory graphics processing unit (GPU) which is a specialized circuit designed to process high-resolution images in memory. This design eliminates the movement back and forth of data between the memory unit and processing unit. Data movement represents one of the most significant limitations in today's computing architectures. Called the von Neumann bottleneck, it has two main implications: it limits computational throughput and consumes considerable energy to move the data between memory and processing.

A memory GPU is a specialized integrated circuit (IC) that combines memory and processing within hardware on the integrated circuit. The memory GPU may be a physical device that can store and manipulate information at the same time by using transistors within the IC. A memory GPU may store entire digital images and then, through the use of transistors, manipulate the entire stored digital image with negligible data movement through different components of a computer system. Similarly, a memory GPU can store a portion of a digital image and then manipulate the entire stored portion of the digital image with negligible data movement through different components of a computer system.

In one embodiment, a memory GPU includes of a large quantity of computing/storing units called herein bit processing cores. The bit processing cores may be low complexity circuits, e.g., having a very low transistor count so that the total number of transistors in the IC are not greater than the number which is able to be manufactured using current state of the art fabrication systems. An estimate of the technological limit for the number of transistors per bit processing core, considering an image with almost 10 million pixels (4K image) should be on the order of a few hundred transistors per bit processing cores, assuming 24 RGB color depth and one bit processing cores per image bit.

One inventive aspect is a graphics processing unit (GPU) for massive parallel processing of at least part of an image, comprising: a plurality of pixel processing cores, each of the pixel processing cores configured to process a pixel of the image, and each of the pixel processing cores comprising a plurality of bit processing cores each configured to process a bit of the pixel; and a plurality of address lines configured to provide access to the bit processing cores, wherein the pixel processing cores are configured to process pixels of the image in parallel.

In some embodiments, the pixel processing cores are configured to process all or substantially all of the pixels of the image in parallel.

In some embodiments, each of the bit processing cores comprises at least two buffers and at least one computing circuit.

In some embodiments, the bit processing cores of each pixel processing core are organized into at least one color channel, the one color channel including a sign bit processing core, a plurality of color channel bit processing cores, and one or more shift operation bit processing core.

In some embodiments, each of the bit processing cores comprises two buffers and two computing circuits.

In some embodiments, the two buffers and a first computing circuit of the two computing circuits are each two-state elements, and a second computing circuit of the two computing circuits is a three-state element.

In some embodiments, each of the buffers is configured to implement functionality of a D flip flop, the first computing circuit comprises a memory gate, and the second computing circuit comprises a memory gate and a state element configured to implement functionality of a JK flip flop.

In some embodiments, each of the pixel processing cores is configured to execute one or more: bit processing core internal copy, bit processing core selective reset, channel shift right, channel left shift, intra-channel addition, bit processing core not, or inter-channel addition.

In some embodiments, the GPU further comprises: a plurality of switches configured to connect two or more of the pixel processing cores via the address lines in order to perform at least a portion of a graphic function.

Another aspect is a graphics processing unit (GPU) for massive parallel processing of at least part of an image, comprising: a plurality of processing cores each configured to process a bit of the image, each of the plurality of processing cores comprising an electronic circuit configured to store information and to process the information; and a plurality of interconnect lines configured to connect the plurality of processing cores; wherein the plurality of processing cores are arranged such that individual pixels of the image are processed in parallel.

In some embodiments, the processing cores are arranged to provide a complete basis of binary operations.

In some embodiments, the electronic circuit comprises two buffers and two computing circuits.

In some embodiments, the two computing circuits comprise a first computing circuit having two states and a second computing circuit having three states.

In some embodiments, the electronic circuit comprises switches configured to: selectively electrically connect the two buffers and the two computing circuits, and selectively electrically connect two or more of the processing cores via the interconnect lines in order to perform at least a portion of a graphic function.

In some embodiments, groups of the processing cores are arranged into pixel cores, and wherein the pixel cores are each configured to process a pixel of the image and have at least one color channel.

Yet another aspect is a method of parallel processing of image data, comprising: moving image data representing at least part of an image from a memory to a memory graphics processing unit (GPU); processing the image data to perform a graphic function including a plurality of processing tasks on different parts of the image data in parallel within the memory GPU; and moving the processed image data from the memory GPU to the memory.

In some embodiments, the graphic function is performed without moving the image data outside of the memory GPU. In some embodiments, the graphic function is performed with a single move of the image data from the memory to the memory GPU.

In some embodiments, the different part of the image data each correspond to a respective individual pixel of the image data.

In some embodiments, the image data represents substantially a full image.

In some embodiments, the different parts of the image data each correspond to a respective individual pixel of the image data.

In some embodiments, the memory GPU comprises a plurality of processing cores configured to provide a complete basis of binary operations used to implement any processing task trough a sequence of operations from the basis.

In some embodiments, the processing tasks are implemented via a combination of one or more of the binary operations.

In some embodiments, the binary operations comprise copy, reset, shift, addition, and not.

In some embodiments, each of the processing cores comprises two buffers and two computing circuits.

In some embodiments, the processing tasks comprise one or more sub-steps, and performing one of the one or more sub-steps comprises: determining a result of the one sub-step by connecting two of the processing cores together via one or more address lines and/or connecting two of: the buffers and the computing circuits together; and storing the result in one of the buffers.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4A illustrates a pixel processing core which may form a portion of a memory GPU in accordance with aspects of this disclosure.

FIGS. 8A and 8B illustrate example state evaluation rules for intra-channel addition in accordance with aspects of this disclosure.

DETAILED DESCRIPTION

Figure 1:
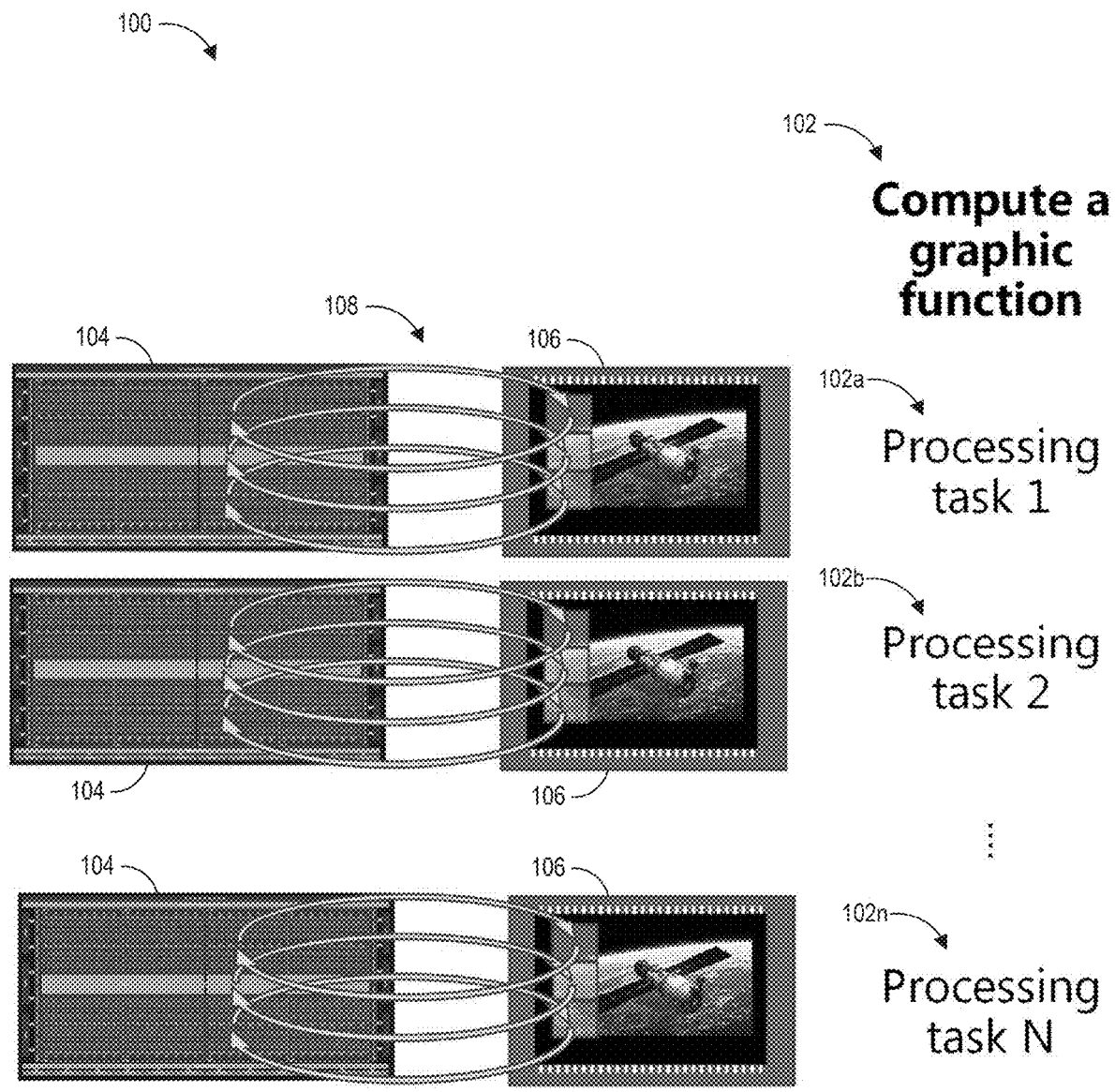
FIG. 1 illustrates a technique for performing a graphic function using a GPU, for example, using pipelined single instruction, multiple data (SIMD) processing.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

Introduction to Graphics Processing Units (GPUs)

Graphics processing units (GPUs) are specialized electronic circuits typically designed to process image data intended for output to a display device. Although GPUs are designed to be specialized for the processing of image data, they may include "generally purpose" processors which can also be programmed to perform computations which can be used outside of the field of image processing.

FIG. 1 illustrates a technique 100 for performing a graphic function 102 using a GPU 104, for example, using pipelined single instruction, multiple data (SIMD) processing. As shown in FIG. 1, a graphic function 102 can include a plurality of processing tasks 102a, 102b, . . . , 102n to complete the graphic function 102.

The GPU 104 is coupled to a memory 106 (e.g., a random access memory (RAM)) configured to store an image. For each of the processing tasks 102a-102n, each block forming the image is moved in data moving operations 108 to the GPU 104 for processing and back to the memory 106 for storage. For example, the GPU 104 is configured to receive a block of the image from the memory 106, perform the processing task 102a-102n on the block, and return the processed block back to the memory 106 after completing each of the processing task 120a-102n. Each block forming the image is processed in sequence until the current processing task 102a-102n is completed. This process is repeated for each of the processing tasks 102a-102n until the graphic function 102 is completed. This process may be referred to as "streaming" the image.

In completing the graphic function 102, each block of the image is moved via a data moving operation 108 between the memory 106 and the GPU 104 in sequence. Since the GPU 104 can only perform each processing task 102a-102n on a sub-set of the entire number of blocks forming the image at a given time, each block in the image must be moved from the memory 106 to the GPU 104 for processing and then returned to the memory 106 for storage. This results in a large number of data moving operations 108 for simply moving data to and from the GPU 104 and memory 106 for reach processing task 102a-102n. In addition, because each processing task 102a-102n is typically performed in order, the GPU 104 cannot perform multiple processing tasks 102a-102n for the same block of data until a current processing tasks 102a-102n has been completed for the entire image. Thus, each block is moved from the memory 106 to the GPU 104 and returned to the memory 106 for storage at least once per processing task 102a-102n.

Although the specific computations performed on a block for a given processing task 102a-102n may be relatively fast and efficient, due to the movement of data as discussed above, the overall time and energy consumed to compute a graphic function 102 may be limited by the number of data moving operations 108. For certain graphic functions, the time and energy costs may be dominated by the data moving operations 108 rather than the computations performed by the GPU 104. Accordingly, significant gains in speed and/or energy can be achieved by reducing the amount of data moving operations 108 to perform graphic functions 102 performed by the GPU 104. Data moving operations 108 can include load operations and store operations, for example.

Traditional GPUs are general purpose distributed architectures historically specialized in multiple graphics tasks. GPUs are becoming even more general purpose to support machine learning and artificial intelligence algorithms. Even though a GPU core may be relatively simple compared and more specialized than central processing units (CPUs), GPUs are still very complex compared to processing circuits which are highly specialized to specific tasks.

Specialized Memory Graphics Processing Units (GPUs)

Embodiments of the described technology relate to a specialized graphics processing unit (GPU), which may be referred to herein as a "MemGPU", a "Memory GPU", or simply a "GPU". The specialized GPU may include components configured to function similarly to a memory circuit, which can reduce the number of data moving operations to compute various graphic functions while also enabling massively parallel processing of a portion and/or an entire image. The memory GPU can be configured to store at least a substantial part of an image within the memory GPU's processing cores to eliminate the need to move data to/from memory 106 while computing a graphic function 102.

As described above, one design goal for the memory GPU is to reshape the modern computing architecture to design an electronic support able to process large high-resolution images while reducing the movement of data from memory 106 to the GPU 104 and vice versa. This data movement represents one of the most significant limitations for traditional GPU computing architectures and is known as the von Neumann bottleneck. The von Neumann bottleneck has two main implications: it sets the limit to the throughput of a computing architecture and the energy consumed for computing is mainly due to move data to compute rather than actually perform computational tasks. Embodiments of this disclosure help alleviate this bottleneck by incorporating specialized circuits that include transistors (e.g., the bit processing core 214 of FIG. 5A) within the memory GPU to directly manage and manipulate graphical data on the memory GPU itself without moving the manipulated data back to memory 106 for storage while processing other portions of the image.

Figure 2:
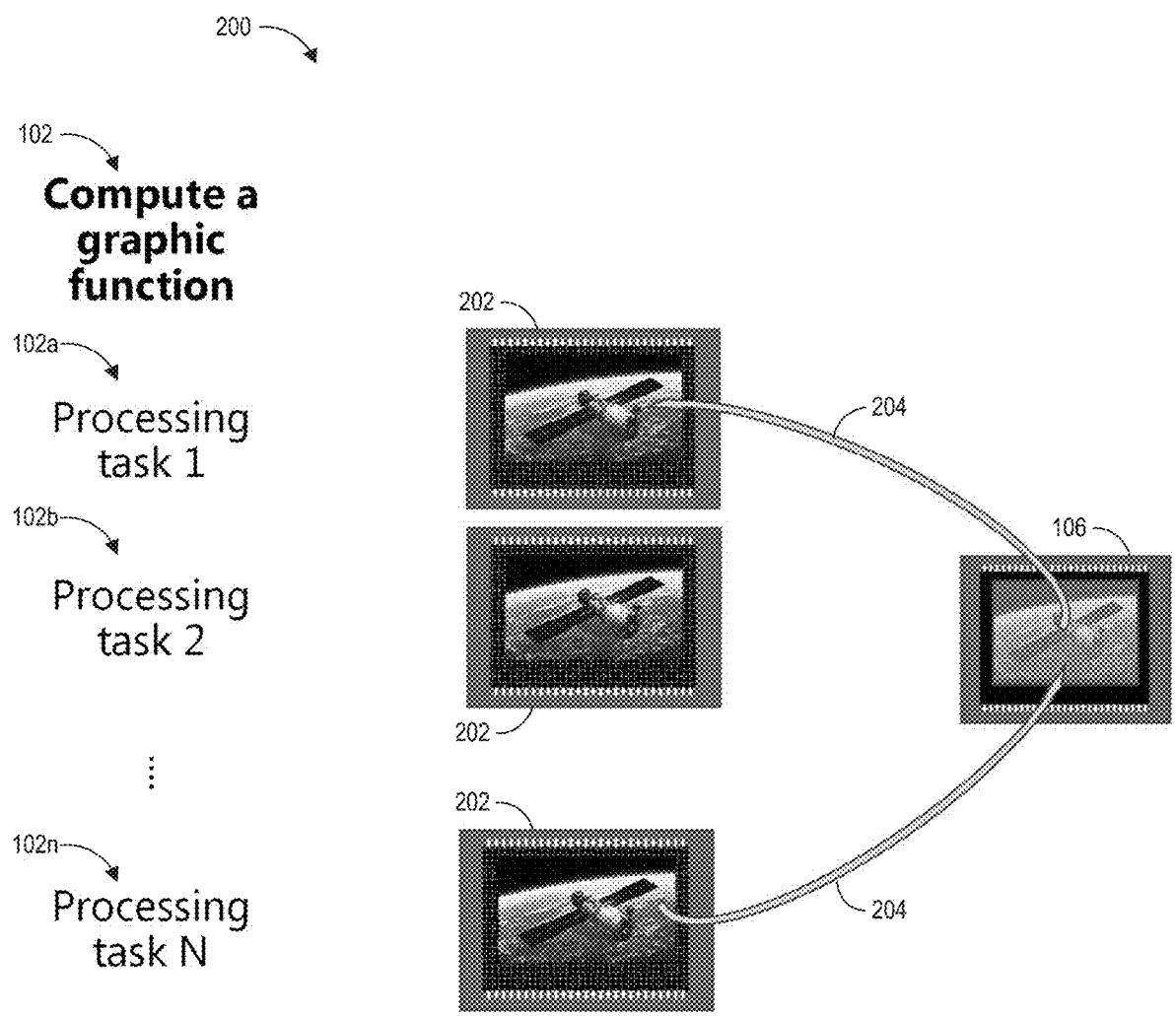
FIG. 2 is a illustrates a technique for performing a graphic function using a memory GPU configured for massive parallel processing in accordance with aspects of this disclosure.

FIG. 2 is a illustrates a technique 200 for performing a graphic function 102 using a memory GPU 202 configured for massive parallel processing in accordance with aspects of this disclosure. Specifically, the memory GPU 202 is configured to address the von Neumann bottleneck by the use of "computational memories", e.g., physical devices that can store and manipulate information at the same time. The memory GPU 202 can perform a plurality of processing tasks on image data with a single load of image data from a memory 106 to the memory GPU 202. The single load can load a full image or a substantial part of the image to the memory GPU 202. The processing tasks can be performed on pixels of the image data in parallel. Processing pixels of the image data in parallel can involve circuitry with significantly less complexity than processing in some state of the art graphics processors.

Similar to FIG. 1, the memory GPU 202 is configured to compute a graphic function 102 including a plurality of processing tasks 102a, 102b, . . . , 102n. In order to compute the graphic function 102, the memory GPU 202 is configured to receive the entire image via a data moving operation 204 from the memory 106 to the memory GPU 202. The memory GPU 202 is configured to perform each of the processing tasks 102a-102n without any further data moving operations 204 that move data between the memory GPU 202 and the memory 106. The graphic function 102 can be performed with a single load or move of data from the memory 106 to the memory GPU 202. The results of the individual processing tasks 102a, 102b, etc. can be stored and saved within the memory GPU 202. Then a subsequent processing task can be performed on the data saved on the memory GPU 202 from the previous processing task. Accordingly, a plurality of consecutive processing tasks of the graphic function 102 can be performed without any data being moved between the memory 106 and the memory GPU 202. Once the graphic function 102 has been computed, the memory GPU 202 can move the entire image back to the memory 106 via a data moving operation 204.

In some embodiments, rather than moving the entire image in each moving operation 204, a portion of the image can be moved for each moving operation 204. Depending on the implementation, when only a portion of the image is moved, each image portion may be moved back to the memory 106 after a processing task 102a-102n is completed on the image portion. In some other embodiments, a plurality of memory GPUs 202 may be provided such that each GPU 202 receives a different portion of the image. The plurality of memory GPUs 202 can process different portions of the image in parallel. In these embodiments, the memory GPU 202 may not move the image back to the memory 106 until the entire graphic function is computed. When a plurality of memory GPUs 202 are used to process different portions of the image in parallel, the memory GPU 202s may be interconnected to enable communication therebetween in order to compute certain processing tasks 102a-102n.

As described herein, the memory GPU 202 can process all pixels of an image (or all pixels of the portion of the image received from memory 106) in parallel. In order to process the pixels in parallel, the memory GPU 202 can include a plurality of subcomponents which may be referred to as "MemCores," "memory cores," "bit processing cores," or "processing cores." Each bit processing core includes transistors and capacitors, can store a bit of the data forming the image, and can perform operations on the data stored within the GPU in order to compute graphic functions. A group of the bit processing cores can be arranged into a pixel processing core (also referred to as a "PixelCore") in order to store and process the data corresponding to a pixel of the image.

The data operations can be achieved by connecting internal components of the bit processing cores and/or nearby bit processing cores in particular ways and/or applying voltages to the internal components of the bit processing cores. A control unit can send electronic signals to trigger the processing within each bit processing core. A system of switches can interconnect the bit processing cores and/or the internal components of the bit processing cores. Such switches can be implemented by transistors.

The memory GPU 202 can include a plurality of address lines (e.g., see the address lines 210 and 212 of FIG. 3A) configured to provide access to the bit processing cores. For example, the address lines can connect each of the bit processing cores to the memory 106 to read/write the data representing the image from/to the memory 106. In some embodiments, the memory GPU 202 can read the data representing the image from the memory 106 to each of the bit processing cores, perform the graphic function 102 on the image data, and write processed data representing the image to the memory 106. The graphic function 102 can be performed without moving the image data outside of the memory GPU 202. For example, the graphic function 102 can be performed with a single move of the image data from the memory 106 to the memory GPU 202 and a single move back from the memory GPU 202 to the memory 106.

Because the memory GPU 202 is configured to store the data representing the image with the bit processing cores, the amount of movement of data is negligible compared to a traditional GPU 104, which results in improvements in both processing speed and energy savings. The topology of an interconnect system within the memory GPU 202 can minimize and/or greatly reduce information movement within a computer system during computational tasks, for example, by eliminating the need to store the data in memory 106 while computing a graphic function 102. The topology can be considered as an evolution of a dynamic random access memory (DRAM)-like topology optimized for graphic tasks. The topology is further configured to leverage the interconnects among bit processing cores to operate efficiently. The signals propagating (or prevented from propagating) through the bit processing cores can carry information therebetween, enabling binary operations.

In order to provide a sufficient number of bit processing cores to store and process an entire image, each bit processing core may be significantly less complex than a processing core of a traditional GPU 104. Modern GPUs 104 can include a number of transistors on the order of $10^{10}$ ($O(10^{10})$). The minimum number of bits to represent a true color (24 bit) 4K image (non-compressed) is 24×3840× 2160~2×$10^8$ bits. Thus, a memory GPU having $O(10^{10})$ transistors can allocate about $O(10^2)$ transistors per bit in order to implement a bit processing core for processing an entire true color 4K image. Due to the comparatively lower complexity of the bit processing cores, each bit processing core may be configured to perform a smaller set of relatively simple computing tasks.

Figure 3A:
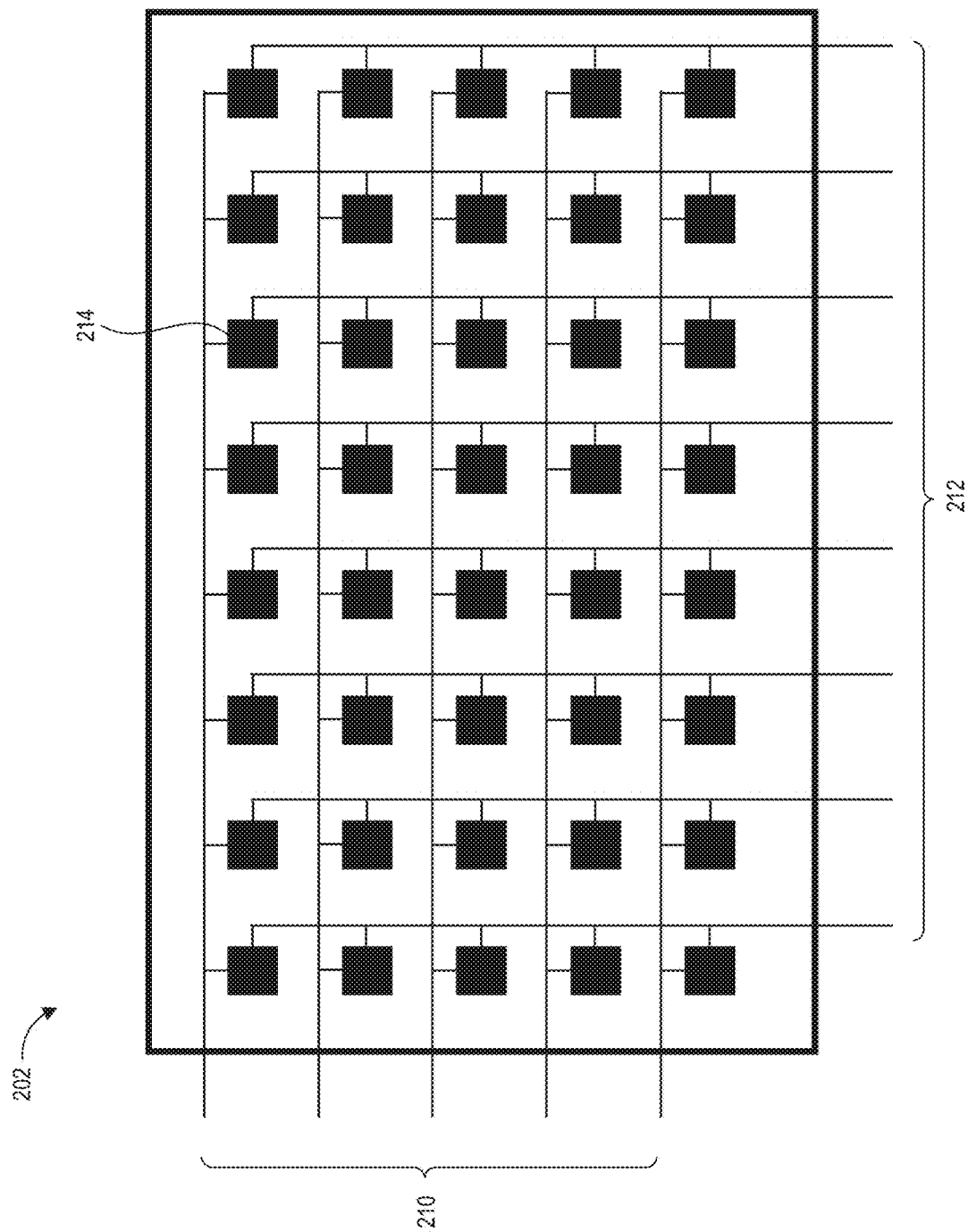
FIG. 3A illustrates a simplified memory GPU including a plurality of bit processing cores and a plurality of address lines in accordance with aspects of this disclosure.

FIG. 3A illustrates a simplified memory GPU 202 including a plurality of bit processing cores 214 and a plurality of address lines 210 and 212 in accordance with aspects of this disclosure. As shown in FIG. 3A, the memory GPU 202 includes a plurality of address lines including word lines 210 and bit lines 212 configured to provide access to the bit processing cores 214. Each of the bit processing cores 214 is connected to at least one word line 210 and at least one bit line 212. However, in some embodiments, each bit processing core 214 can be connected also to a dual bit line.

The address lines 210 and 212 can together address an individual bit processing core 214 to provide access to the individual bit processing core 214. Accessing a bit processing core 214 can involve at least one of reading, writing, or refreshing the processing core 214. The address lines 210 and 212 enable data to be written to and/or read from the bit processing cores 214. For example, image data received from a memory 106 can be written to the bit processing cores 214 and after a graphic function has been computed, the resulting image can be read from the bit processing cores 214 and written back into memory 106. The illustrated configuration of address lines 210 and 212 enables reading, writing, and/or refreshing if volatile memory. The address lines 210 and 212 can also be used to send signals to bit processing cores 214 to trigger processing (e.g., binary operations). Thus, the address lines can be used to both move data (read, write, copy) and enable processing on bit processing cores 214 linked by the address lines.

In order to enhance the computing capability of each bit processing core, aspects of this disclosure provide interconnections between the bit processing cores, enabling the bit processing cores to operate as isolated components (as in standard computing architectures) as well as while connected. This flexibility increases the computing capability of the bit processing cores 214, and thus the memory GPU 202, without significantly increasing the number of transistors used to implement the memory GPU 202.

Figure 3B:
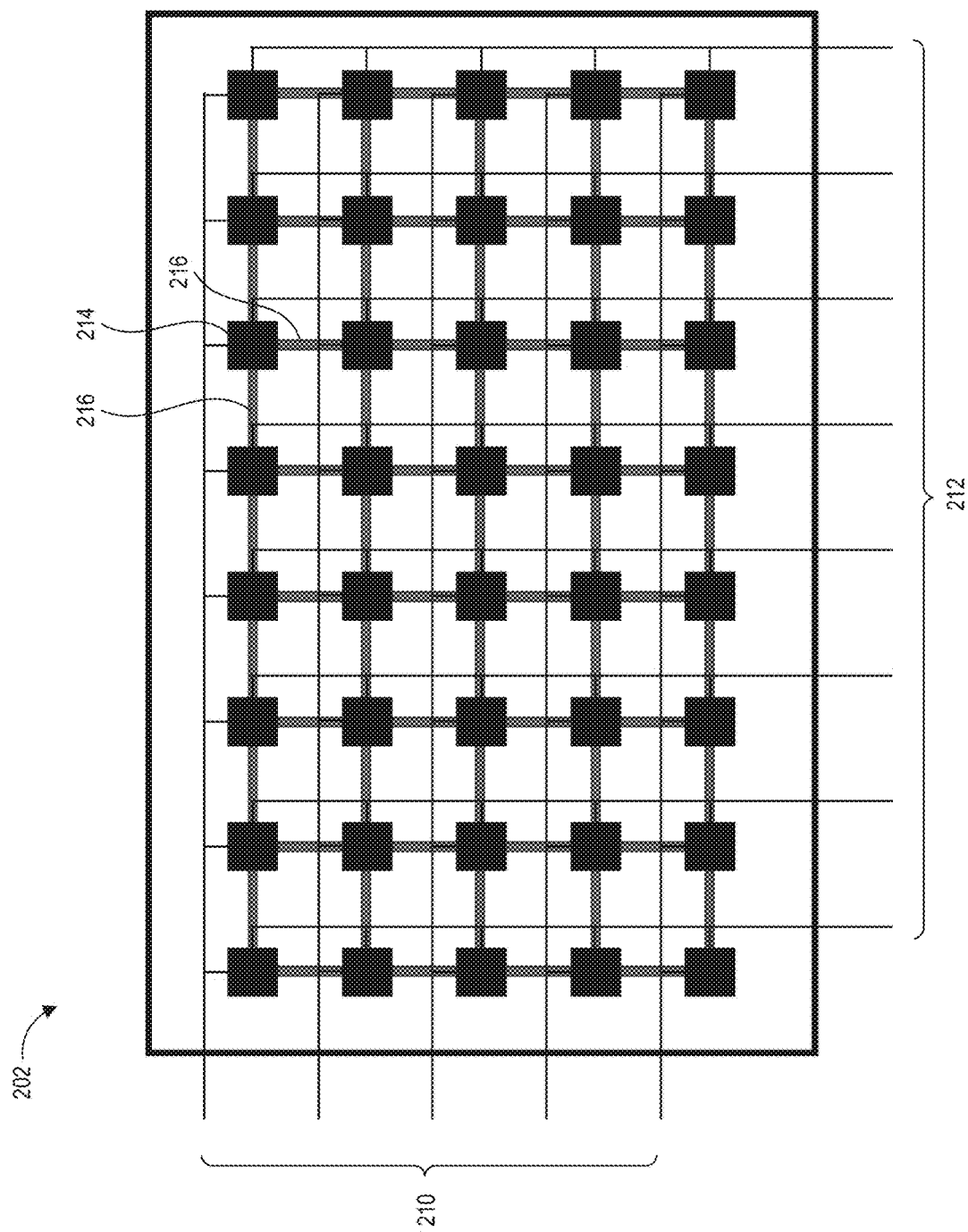
FIG. 3B illustrates the simplified memory GPU that includes interconnect lines between bit processing cores in accordance with aspects of this disclosure.

FIG. 3B illustrates a simplified memory GPU 202 that includes interconnect lines 216 in accordance with aspects of this disclosure. As shown in FIG. 3B, the memory GPU 202 includes word lines 210, bit lines 212, and interconnect lines 216. The interconnect lines 216 can provide direct communication paths between adjacent bit processing cores 214. For example, horizontal interconnect lines 216 can connect two bit processing cores 214 which are adjacent in the horizontal direction, while vertical interconnect lines 216 can connect two bit processing cores 214 which are adjacent in the vertical direction. The bit processing cores 214 can be interconnected with each other in any suitable way for a particular application. For example, as discussed below, bit processing cores 214 can be interconnected as one or more channels to process color data for a pixel of image data.

The interconnect lines 216 can be used to enable communication between bit processing cores 214, which can be used to implement certain portions of binary operations. The particular topology of the interconnect lines 216 may be specialized to the operations used for graphic processing. The interconnect lines 216 can be used to transmit triggers used to initiate a processing operation. In some embodiments, the memory GPU 202 may include a control circuit (e.g., the control circuit 690 of FIG. 22) configured to generate and transmit appropriate signals to trigger operations for performing a processing task 102a-102n. As described herein, this can be accomplished by selectively connecting the bit processing cores 214 and the internal components of the bit processing cores 214 to perform binary operations. The interconnect lines 216 can be used to provide data from one bit processing core 214 to an interconnected bit processing core 214.

A plurality of bit processing cores 214 can be arranged together in a larger unit to process a portion of image data. The lager unit of bit processing cores 214 can process a large number of such portions of the image data in parallel in a memory GPU 202. For example, bit processing cores 214 can be arranged to process a pixel of image data such that pixels of the image data are processed in parallel. Example pixel processing cores 220 that include a plurality of bit processing cores 214 will be discussed with reference to FIGS. 4A and 4B. Bit processing cores 214 can alternatively or additionally be arranged together to process any suitable portion of image data.

FIG. 4A illustrates a pixel processing core 220 which may form a portion of a memory GPU 202 in accordance with aspects of this disclosure. As shown in FIG. 4A, the pixel processing core 220 includes a plurality of bit processing cores 214, which can be organized into color channels 222, 224, and 226. In one embodiment, the color channels may include a red color channel 222, a green color channel 224, and a blue color channel 226. However, other color channels are also possible such as YUV, CMYK, HSV, or grayscale. In some instances, a pixel processing core can include a single channel (e.g., for grayscale). In some instances a pixel core can include the alpha channel.

As illustrated, each of the color channels can include at least one sign bit processing core 232, a plurality of color channel bit processing cores 234, and at least one shift operation bit processing core 236. The number of color channel bit processing cores 234 may correspond to the bit depth of the corresponding color channel 222-226. The sign bit processing cores 232 can be configured to store a sign of the data represented by the corresponding color channel bit processing cores 234. The sign bit processing cores 232 may be used to perform certain operations such as a difference operation. The one shift operation bit processing core 236 can be configured to temporarily store a bit of data during shift operations. In some implementations, the pixel processing core 220 can include additional shift bit processing cores 236 to represent decimals for increasing precision in operations like product.

Figure 4B:
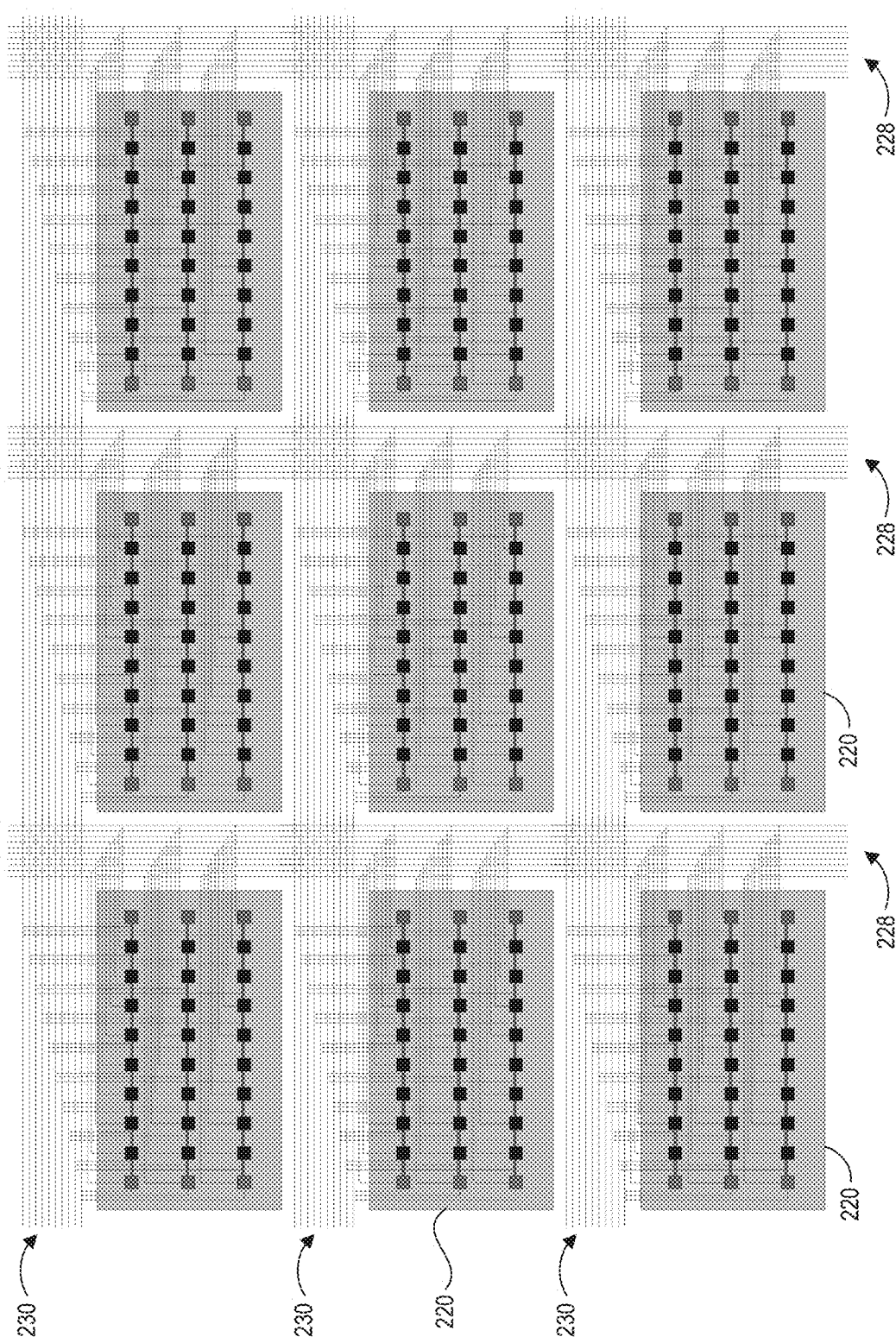
FIG. 4B illustrates the connections between pixel processing cores using the inter-channel interconnect lines and the inter-pixel processing core interconnect lines in accordance with aspects of this disclosure.

The pixel processing core 220 also includes a plurality of intra-channel interconnect lines 216 that connect adjacent bit processing cores 232-236, which are substantially similar to the interconnect lines 216 of FIG. 3B. The intra-channel interconnect lines 216 can be used to process colors represented within a pixel processing core 220. The pixel processing core 220 is also connected to a plurality of inter-channel interconnect lines 228 and a plurality of inter-pixel processing core interconnect lines 230 which can be used to process pixel data. FIG. 4B illustrates the connections between pixel processing cores 220 using the inter-channel interconnect lines 228 and the inter-pixel processing core interconnect lines 230. The inter-channel and the inter-pixel interconnect lines 228 and 230 can be used to address pixel processing cores 220 to both process pixel data as well as act as bit line (inter-channel lines) and word lines (inter-pixel lines). Although not illustrated, each of the inter-channel interconnect lines 228 and the inter-pixel processing core interconnect lines 230 can be provided with one or more controlled switches configured to enable different connections between the bit processing cores 214 and/or pixel processing cores 220. In addition, the switches can be configured to connect two or more of the pixel processing cores 214 via the address lines 210 and 212 for performing at least a portion of a graphic function. These switches may be controlled by a control circuit (such as the control circuit 690 illustrated in FIG. 22).

The memory GPU 202 including a plurality of bit processing cores 214 arranged to form pixel processing cores 220 can use the interconnection topologies as described herein to perform at least the following elemental operations: copy, reset, shift, addition, and not. These operations may be sufficient to form a complete basis of binary operations, e.g., any other function is producible by these base operations. In fact, the OR and NOT functions can be derived from the above elemental operation (where OR and NOT form a complete Boolean basis). Aspects of the disclosed architecture also allow for massively parallel computation of these functions, e.g., each operation can be performed at the same time by all bit processing cores 214 and/or by all channels 222-226 within the memory GPU 202. As described herein, the base operations can be used to implement more complex functions such as two's complement (e.g., see FIG. 10), the product of a channel by a scalar smaller than one, and inter-channel addition (e.g., see FIGS. 11A-11C).

The interconnect topology illustrated in FIGS. 4A and 4B may be well suited for graphic processing since this topology is specialized for processing image data that is encoded in pixels, where the color of each pixel is defined by color channels, and each color channel has a depth defined by a certain number of bits. This bitmap encoding of an image may also imply that most of the relevant graphic processing tasks can be reduced to elemental operations between nearest neighboring pixels.

There may be additional signal lines included in the memory GPU 202 connected to the pixel processing cores 220 and/or bit processing cores 214 not shown in FIGS. 4A and 4B. For example, the memory GPU 202 can include signal lines for controlling switches configured to interconnect components of the bit processing cores 214, as well as for connecting the bit processing cores to the address lines 228 and/or 230. The memory GPU 202 can include rail power lines that supply one or more different power levels for controlling the pixel processing cores 220 and/or bit processing cores 214.

Figure 5A:
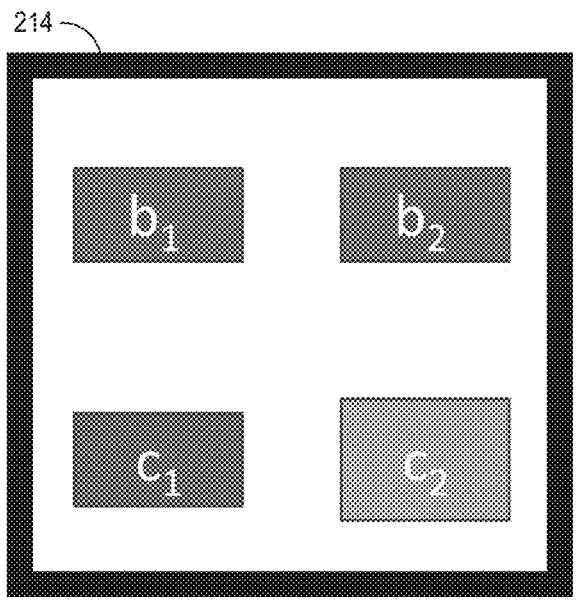
FIG. 5A illustrates an embodiment of a bit processing core in accordance with aspects of this disclosure.
Figure 5B:
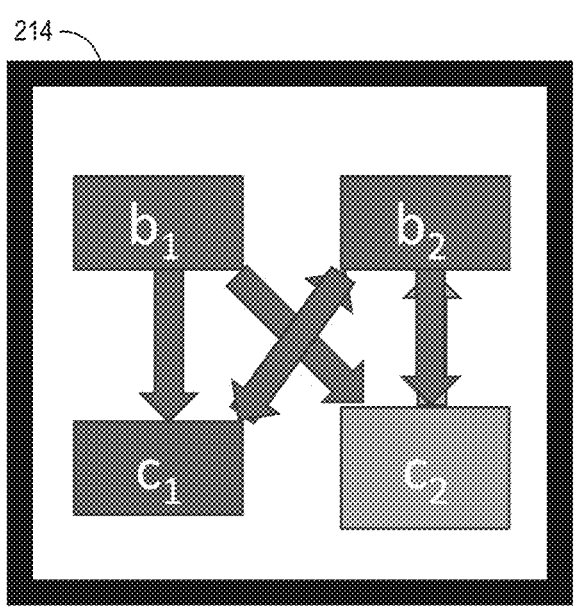
FIG. 5B illustrates an embodiment of the flow of data within a bit processing core in accordance with aspects of this disclosure.

FIG. 5A illustrates an embodiment of a bit processing core 214 in accordance with aspects of this disclosure. FIG. 5B illustrates an embodiment of the flow of data within a bit processing core 214 in accordance with aspects of this disclosure. Some or all of the bit processing cores 214 of a memory GPU 202 can be implemented in accordance with any suitable principles and advantages as discussed with reference to FIG. 5A and FIG. 5B. For example, all bit processing cores 214 of a memory GPU 202 can be implement as discussed with reference to FIG. 5A and FIG. 5B.

Referring to FIG. 5A, the bit processing core 214 includes a first buffer $b_1$, a second buffer $b_2$, a first computing circuit $c_1$, and a second computing circuit $c_2$ (compute circuits also referred to as "compute cores"). However, FIG. 5A is one illustrative embodiment of a bit processing core 214. In other embodiments, a bit processing core 214 can include a greater or fewer number of buffers and/or computing circuits. For example, in one embodiment a bit processing core 214 can include two buffer $b_1$ and $b_2$ and a single computing circuit $c_1$ or $c_2$. It may be possible to provide a complete basis of binary operations with a little as two buffer $b_1$ and $b_2$ and a single computing circuit $c_1$ or $c_2$. As used herein, a complete basis of binary operations may refer to a set of operations that can be combined to perform any arbitrary binary operation.

Figure 12A:
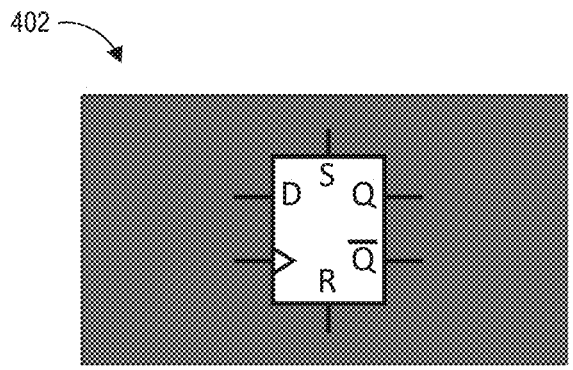
FIGS. 12A-12C illustrate circuit elements which can be used to implement buffers and computing circuits of a bit processing core in accordance with aspects of this disclosure.
Figure 12B:
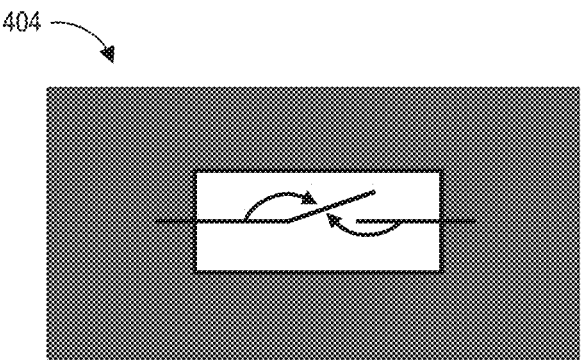
Figure 12C:
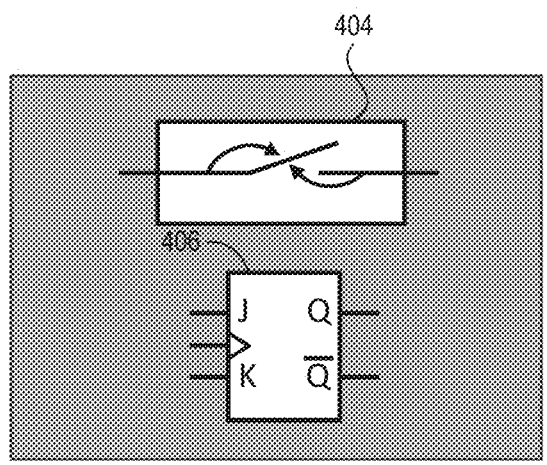

Each of the buffers $b_1$ and $b_2$ can be configured to store binary data (e.g., one bit of data). Each of the computing circuits $c_1$ and $c_2$ can be configured to have one of at least two states. In one embodiment, the first computing circuit $c_1$ may be a two-state element (e.g., may have one of two possible states) while the second computing circuit $c_2$ may be a three-state element (e.g., may have one of three possible states). In some embodiments, the computing circuits $c_1$ and $c_2$ can include an internal buffer which can be reset to 0 or 1 independently (also referred to as "bit processing core selective reset"). Similarly, each of the buffers $b_1$ and $b_2$ can also be reset to 0 or 1 independently. The third state of the second computing circuit $c_2$ may be referred to as a "meta-state" or an intermediate state, which can be a state used in intermediate steps of certain elemental operations like ADD and NOT. However, in certain embodiments the meta-state may not be used to encode inputs or outputs of an operation. Example embodiments of the buffers $b_1$ and $b_2$ and computing circuits $c_1$ and $c_2$ are illustrated in FIGS. 12A-12C and described in more detail in connection with these figures.

With reference to FIG. 5B, the bit processing core 214 can be configured to move data between the buffers $b_1$ and $b_2$ and computing circuits $c_1$ and $c_2$. In some embodiments, the bit processing core 214 can be configured to move data from any one of the elements $b_1$, $b_2$, $c_1$, and $c_2$ to any other one of the elements. However, in some other embodiments, the bit processing core 214 can be configured to move data in a subset of the possible combinations of data movements in order to reduce the complexity of the bit processing core 214, and thus, the number of transistors that implement the bit processing core 214. As shown in FIG. 5B, the bit processing core 214 is configured to move data from the first buffer $b_1$ to the first computing circuit $c_1$, from the first buffer $b_1$ to the second computing circuit $c_2$, in both directions between the second buffer $b_2$ and the first computing circuit $c_1$, and in both directions between the second buffer $b_2$ and the second computing circuit $c_2$. As described in more detail herein, the selective movement of data between the buffers $b_1$ and $b_2$ and computing circuits $c_1$ and $c_2$ can be used to compute binary operations.

Although the terms "copy" or "move" may be used to refer to operations in which the binary value from one element (e.g., buffer or computing circuit) is reflected on another element, in some situations this may not involve any signals being transmitted between the elements. For example, when a memory circuit is storing a value of zero, the application of a voltage may result in the memory circuit preventing a signal from being output to the next element. In this way, the value "zero" may be copied to another element without transmitting any signal therebetween.

Figure 6:
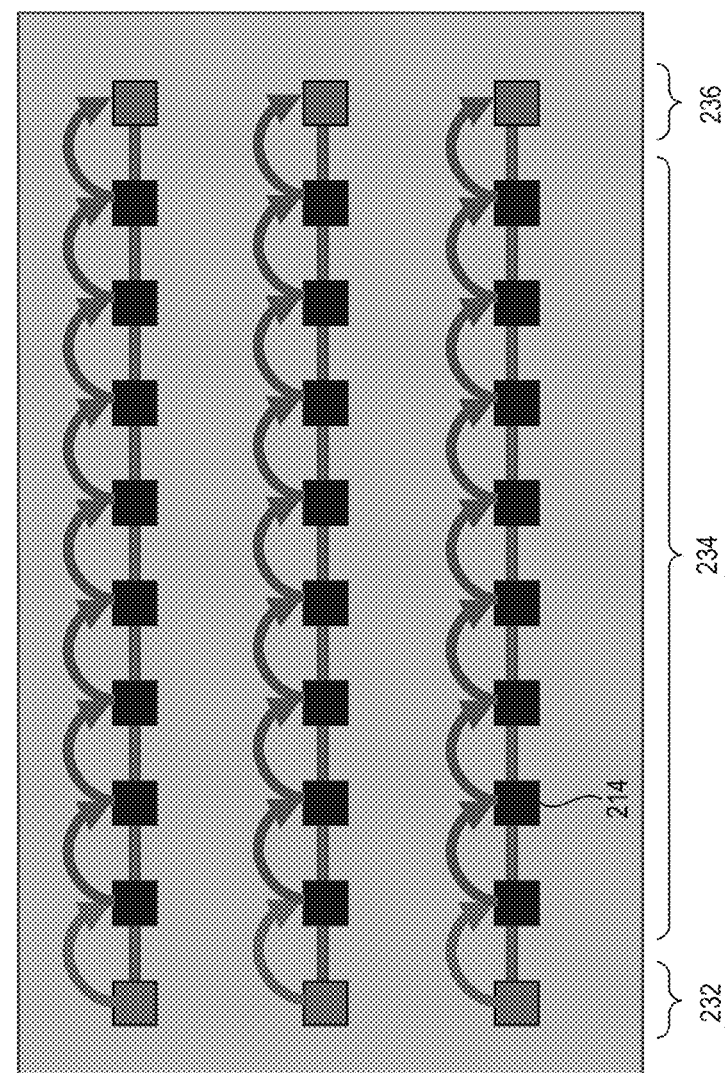
FIG. 6 illustrates data flow in a pixel processing core for an example channel right shift operation executed by the pixel computing core in accordance with aspects of this disclosure.
Figure 7:
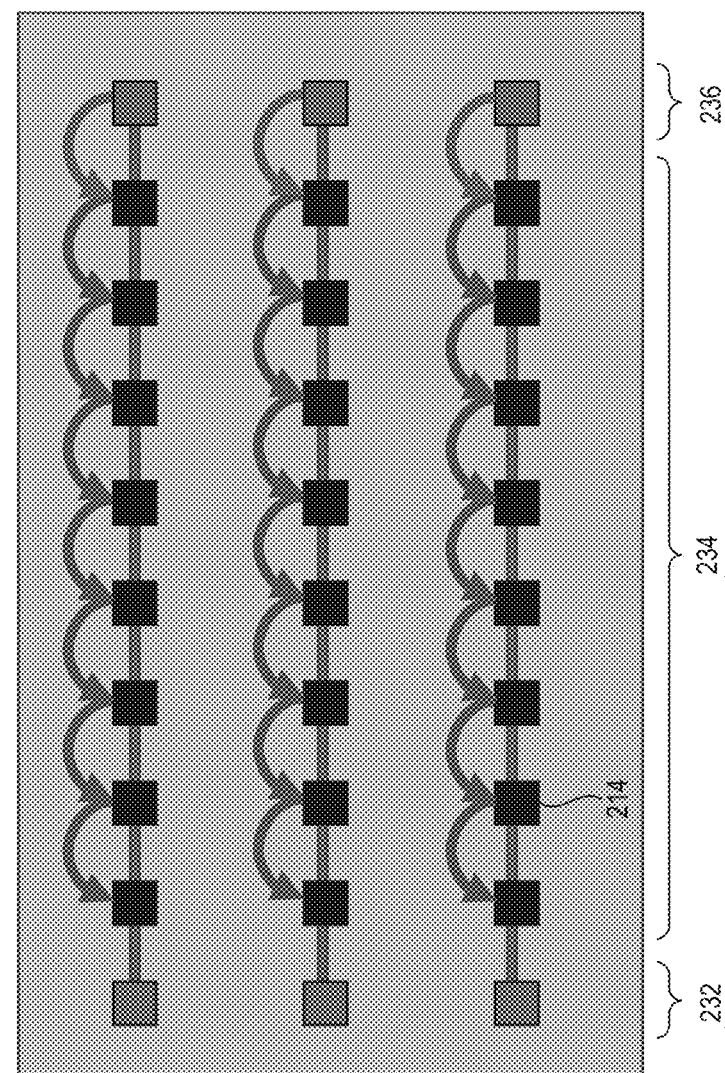
FIG. 7 illustrates data flow in a pixel processing core for an example channel left shift operation executed by the pixel computing core in accordance with aspects of this disclosure.

FIG. 6 illustrates data flow in a pixel processing core 220 for an example channel right shift operation executed by the pixel processing core 220 in accordance with aspects of this disclosure. Similarly, FIG. 7 illustrates data flow in a pixel processing core 220 for an example channel left shift operation executed by the pixel processing core 220 in accordance with aspects of this disclosure. In some embodiments, each of the shift operations may involve only the buffers $b_1$ and/or $b_2$ and/or the computing circuits $c_1$ and $c_2$ of each bit processing core 214. The channel right shift and channel left shift operations can be used to represent division and multiplication by two, respectively.

As shown in FIG. 6, during the channel right shift operation, the sign bit processing core 232 may send data to the adjacent color channel bit processing core 234 without changing the state of the sign bit processing core 232. The shift operation bit processing core 236 may receive data from the adjacent color channel bit processing core 234 without sending any data. Each bit processing core 214 can provide data to a neighboring processing core to the right in the channel for the channel right shift operation.

As shown in FIG. 7, during the channel left shift operation, the sign bit processing core 232 may not send or receive any data. The shift operation bit processing core 236 may send data to the adjacent color channel bit processing core 234 and then may reset the data stored in the shift operation bit processing core 236 to zero. Each bit processing core 214 can provide data to a neighboring processing core to the left in the channel for the channel right left operation.

FIGS. 8A and 8B illustrate example state evaluation rules for intra-channel addition in accordance with aspects of this disclosure. As used herein, intra-channel addition generally refers to the sum possibly with sign of two channel values interpreted as numbers in binary representation. For example, a channel value can be defined by the state of all bits stored in the first computing circuits $c_1$ of a channel and can be interpreted as the number $n_1 = c_{1,k} 2^k + \ldots + c_{1,0} 2^0$, where $c_{1,k}$ is the bit stored in the first computing circuit $c_1$ of the leftmost bit processing core 214 of the channel and $c_{1,0}$ the rightmost first computing circuit $c_1$. Similarly, $n_2 = c_{2,k} 2^k + \ldots + c_{2,0} 2^0$ can be defined on the second computing circuits $c_2$. Thus, in some implementations intra-channel addition can be defined as the operation that performs $n_1 + n_2$ and stores the results on the second computing circuits $c_2$. In particular, FIG. 8A illustrates a first step 302 and FIG. 8B illustrates a second step 304 for performing intra-channel addition. By performing the first and second steps 302 and 304, the data stored in the first computing circuits $c_1$ of a channel can be added in the sense described in this paragraph to the data stored in the second computing circuits $c_2$ of the same channel. Intra-channel addition can be massively parallelized to all channels within the memory GPU 202.

In the first step 302, the operation happens within the bit processing core 214; the states of the first and second computing circuits $c_1$ and $c_2$ before evaluation and the corresponding resulting states of the second computing circuit $c_2$ after evaluation are shown. For example, when the state of both of the first and second computing circuits $c_1$ and $c_2$ is zero, the post-evaluation state of the second computing circuit $c_2$ will be zero. When the state of one of the first and second computing circuits $c_1$ and $c_2$ is zero and the state of the other of the first and second computing circuits $c_1$ and $c_2$ is one, the post-evaluation state of the second computing circuit $c_2$ will be one. Finally, when the state of both of the first and second computing circuits $c_1$ and $c_2$ is one, the post-evaluation state of the second computing circuit $c_2$ will be two. This can be summarized as adding the states of the first and second computing circuits $c_1$ and $c_2$ and saving the results in the second computing circuit $c_2$.

The second step 304 happens at channel level, where a signal s starting from the rightmost second computing circuit $c_2$ of the channel passes through the channel driving the state change of the second computing circuits $c_2$. In the second step 304, the signal output $s_{2,j-1}$ from the second computing circuit $c_{2,j-1}$ passes through the second computing circuit $c_{2,j}$. The signal $s_{2,j-1}$ is an information carrier signal carrying information on the state of $c_{2,j-1}$. The consequence of signal $s_{2,j-1}$ passing through the second computing circuit $c_{2,j}$ is that the state of $c_{2,j}$ will change into a new state $c'_{2,j}$ and the second computing circuit $c_{2,j}$ will output a carrier signal $s_{2,j}$. The second step 304 reports the evolution of both the carrier signals s and the second computing circuit state $s_2$ as a consequence of the carrier signals passing through the channel. When the signal carrier $s_{2,j-1}$ from the previous second computing circuit $c_{2,j-1}$ carries a "zero" of information and the state of the second computing circuit $c_{2,j}$ of the current second computing circuit is zero or one, the output carrier signal $s_{2,j}$ of the second computing circuit $c_{2,j}$ after evaluation will carry zero and the new state $c'_{2,j}$ of the second computing circuit $c_{2,j}$ is zero or one, therefore it remains unchanged. When the signal carrier $s_{2,j-1}$ from the previous second computing circuit $c_{2,j-1}$ carries a "one" of information and the state of the second computing circuit $c_{2,j}$ of the current bit processing core 214 is zero, the output carrier signal $s_{2,j}$ of the second computing circuit $c_{2,j}$ after evaluation will carry zero and the new state $c'_{2,j}$ of the computing circuit $c_{2,j}$ is one. When the signal carrier $s_{2,j-1}$ from the previous second computing circuit $c_{2,j-1}$ carries a "zero" of information and the state of the second computing circuit $c_{2,j}$ of the current bit processing core is two, the output carrier signal $s_{2,j}$ of the second computing circuit $c_{2,j}$ after evaluation will carry one and the new state $c'_{2,j}$ of the second computing circuit $c_{2,j}$ is zero. Finally, when the signal carrier $s_{2,j-1}$ from the previous second computing circuit $c_{2,j-1}$ carries a "one" of information and the state of the second computing circuit $c_{2,j}$ of the current bit processing core is either one or two, the output carrier signal $s_{2,j}$ of the second computing circuit $c_{2,j}$ after evaluation will carry one and the new state $c'_{2,j}$ of the second computing circuit $c_{2,j}$ is zero if previously one, or one if previously two.

Figure 9A:
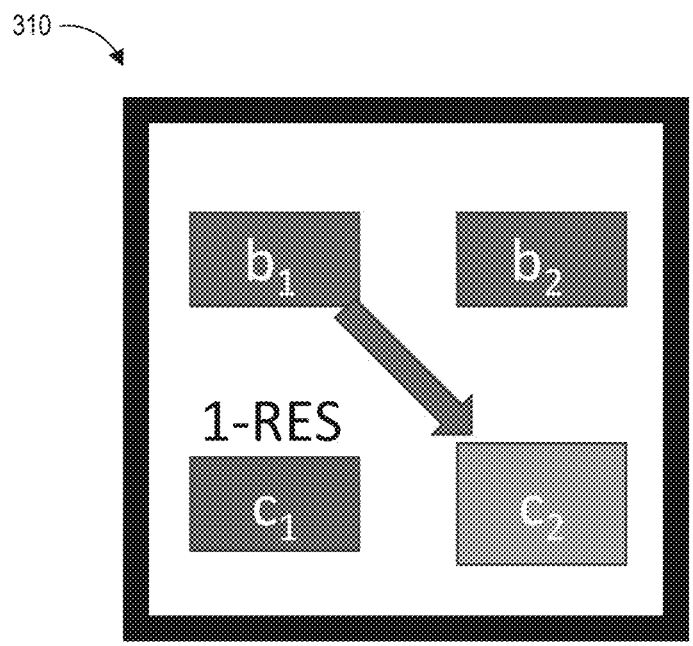
FIGS. 9A-9C illustrate the steps involved in a "not" operation for a bit processing core in accordance with aspects of this disclosure.
Figure 9B:
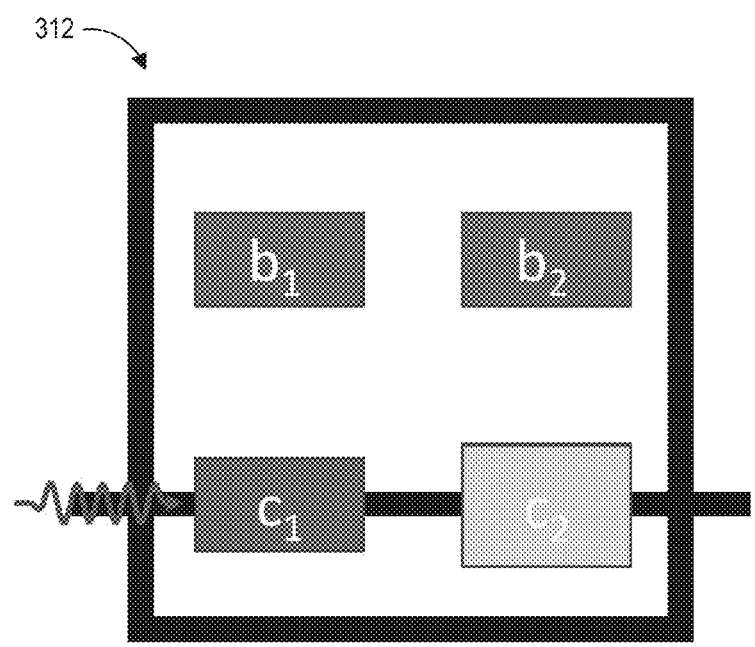
Figure 9C:
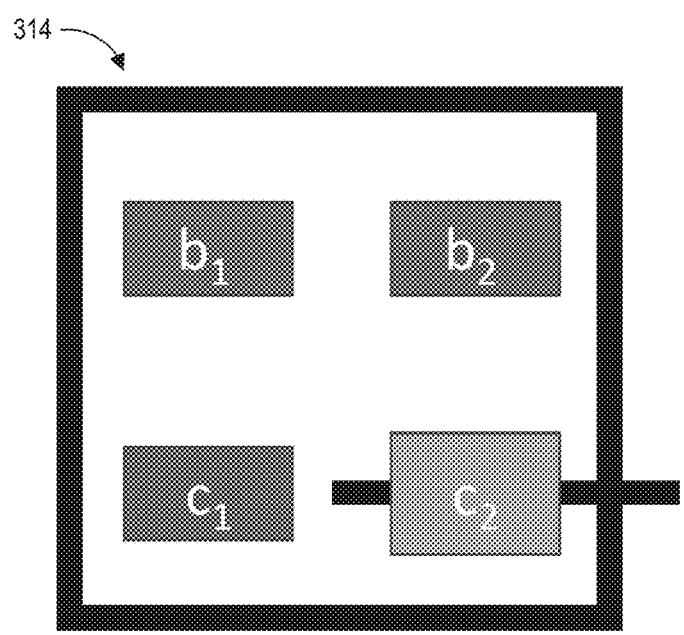

FIGS. 9A-9C illustrate the steps involved in a "not" operation (also referred to as "bit processing core not") in accordance with aspects of this disclosure. For example, in a first step 310 the bit from the first buffer $b_1$ is copied to the second computing circuit $c_2$ and the first computing circuit $c_1$ is reset to one. In a second step 312, the first and second computing circuits $c_1$ and $c_2$ are connected together and an input signal is applied to the first computing circuit $c_1$, resulting in the second computing circuit $c_2$ changing state following the evolution rule 302. Since the first computing circuit $c_1$ is reset to one, after the operation 312 and because of the evolution rule 302, $c_2$ will be in either state one or two if previously was zero or one respectively. Finally, in a third operation (e.g., as shown in FIG. 9C), the second computing circuit $c_2$ is internally connected such that if the state is one the second computing circuit $c_2$ does not change, while if the state is two, the second computing circuit $c_2$ will switch its state to zero and release a signal carrying one. The not operation can also be massively parallelized to all bit processing cores 214 or any subset of the bit processing cores 214 within the memory GPU 202.

Figure 10:
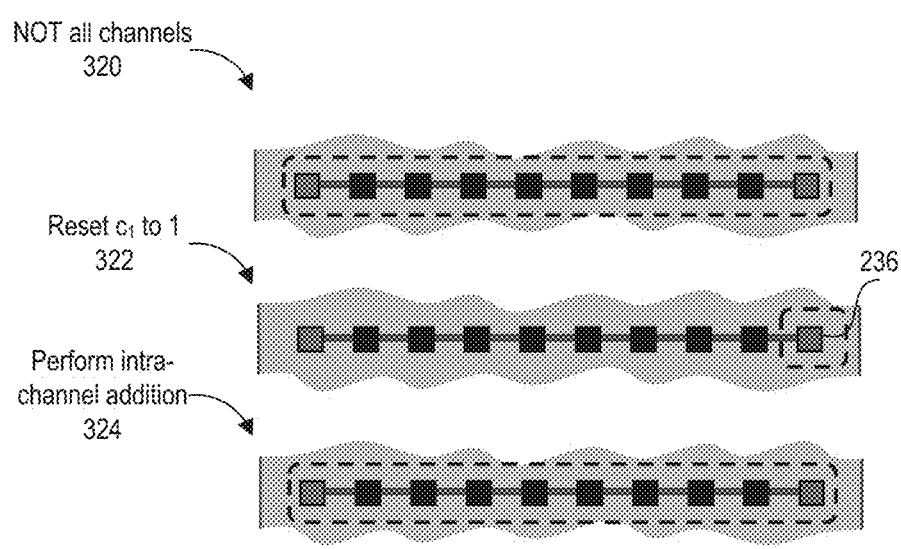
FIG. 10 illustrate the steps involved in a channel two's complement operation in accordance with aspects of this disclosure.

FIG. 10 illustrates the steps involved in a channel two's complement operation in accordance with aspects of this disclosure. For example, in a first step 320 a not operation can be performed on all bit processing cores for the selected channel. In a second step 322, the computing circuit $c_1$ of the shift operation bit processing core 236 can be reset to one. In a third step 324 intra-channel addition can be performed on the selected channel.

Two's complement can be used to determine a difference of colors. Two's complement may be calculated according to the following equation:

$$2's(c) = \bar{c} + 1_d$$

where $\bar{c}$ is bit-wise not and $1_d$ is the value one at the least significant decimal position.

As another example, the memory GPU 202 can be used to perform the operation product color*p with p≤1. This operation may be a basic operation used for many graphic processing operations. The operation product color*p can be defined as follows:

$$cp = c\sum_{j=1}^{N} \frac{1}{2^j} p_j$$

When N=4, this may be equivalent to the following equation:

$$cp = \frac{c}{2^1}p_1 + \frac{c}{2^2}p_2 + \frac{c}{2^3}p_3 + \frac{c}{2^4}p_4$$

which can be simplified as:

$$cp = \frac{c}{2^1}p_1 + \frac{c}{2^2}p_2 + \left(\frac{c}{2}p_3 + \frac{c}{2^2}p_4\right)\frac{1}{2^2} \text{ where } c' = \left(\frac{c}{2}p_3 + \frac{c}{2^2}p_4\right),$$

$$cp = \frac{c}{2^1}p_1 + \left(\frac{c}{2}p_2 + \frac{c'}{2}\right)\frac{1}{2} \text{ where } c'' = \left(\frac{c}{2}p_2 + \frac{c'}{2}\right),$$

$$cp = \frac{c}{2^1}p_1 + \frac{c''}{2}$$

A channel of a pixel processing core 220 can be used to store the value c using the buffers $b_1$ in each bit processing core 214. c' can be computed using the following set of operations (CHRS=channel right shift, CHAdd1=channel sum defined by the first step 302, CHAdd2=channel sum defined by the second step 304, 0-RES=reset state to 0):

case $p_3=p_4=1$
COPY $b_1 \rightarrow c_1, c_2$
CHRS $c_1$
CHRS $c_2$ twice
CHAdd1
CHAdd2
case $p_3=0, p_4=1$
and $p_3=1, p_4=0$
COPY $b_1 \rightarrow c_2$
0-RES $c_1$
CHRS $c_2$ (twice if $p_4=1$)
case $p_3=p_4=0$
0-RES $c_1, c_2$ c" can be computed using the following set of operations (it is assumed c' remains stored on the computing circuits $c_2$s:

case $p_2=1$
COPY $b_1 c_1$
CHRS $c_1$
CHRS $c_2$
CHAdd1
CHAdd2
case $p_2=0$
0-RES $c_1$
CHRS $c_2$ cp can be computed using the following set of operations (it is assumed c" remains stored on the computing circuits $c_2$s:

case $p_1=1$
COPY $b_1 \rightarrow c_1$
CHRS $c_1$
CHRS $c_2$
CHAdd1
CHAdd2
case $p_1=0$
0-RES $c_1$
CHRS $c_2$ The above described algorithm can produce a product pc with the same precision as having c with N-1 extra decimal digits and truncate them after computation. This operation can be massively parallelized over all color channels with no movement of memory from bit processing cores. The product pc can be stored on $c_2$ and can be put in the buffer $b_2$ or used with other pixel processing cores 220. This operation may have a complexity of 5N.

Figure 11A:
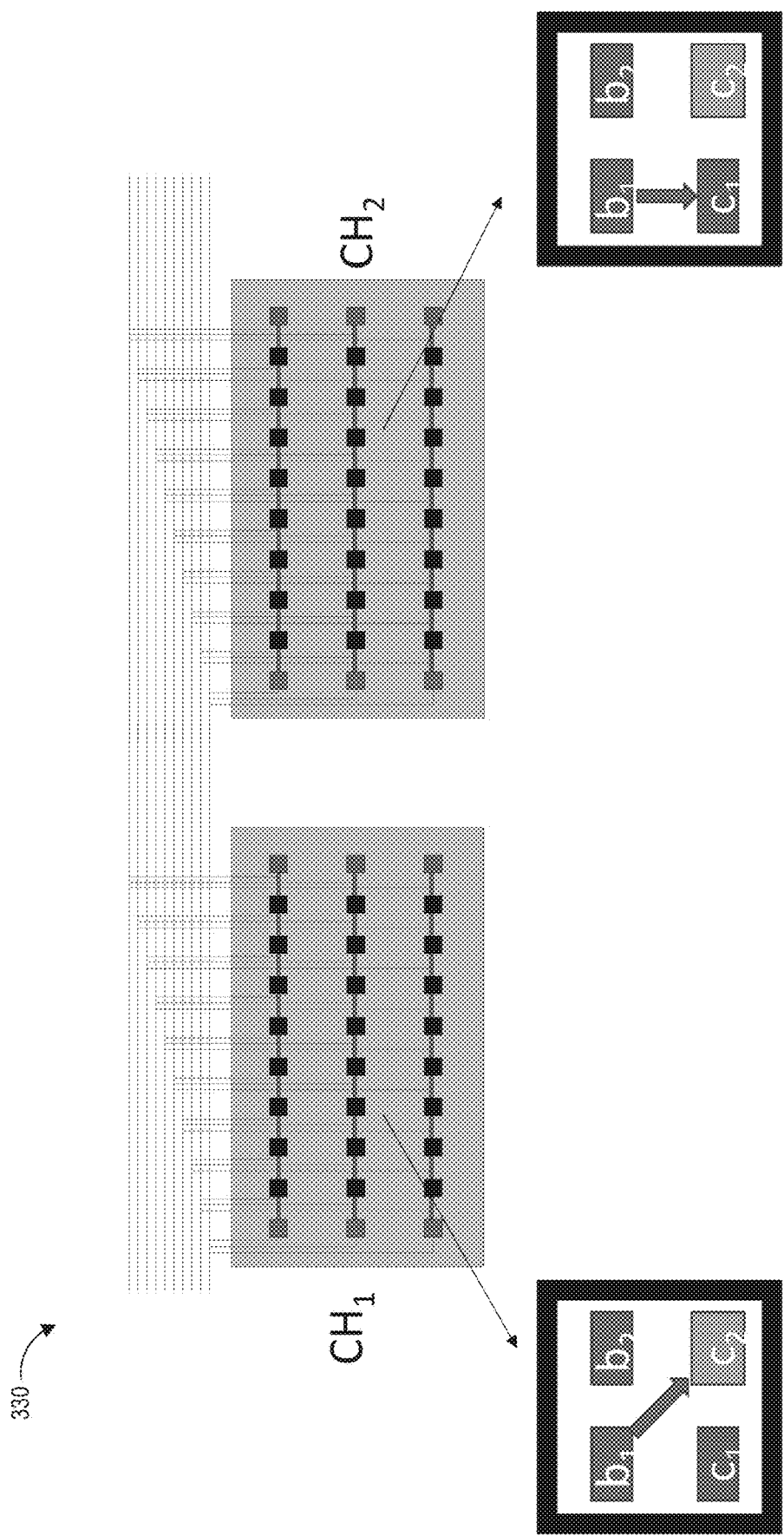
FIGS. 11A-11C illustrate the steps involved in an inter-channel addition operation in accordance with aspects of this disclosure.
Figure 11B:
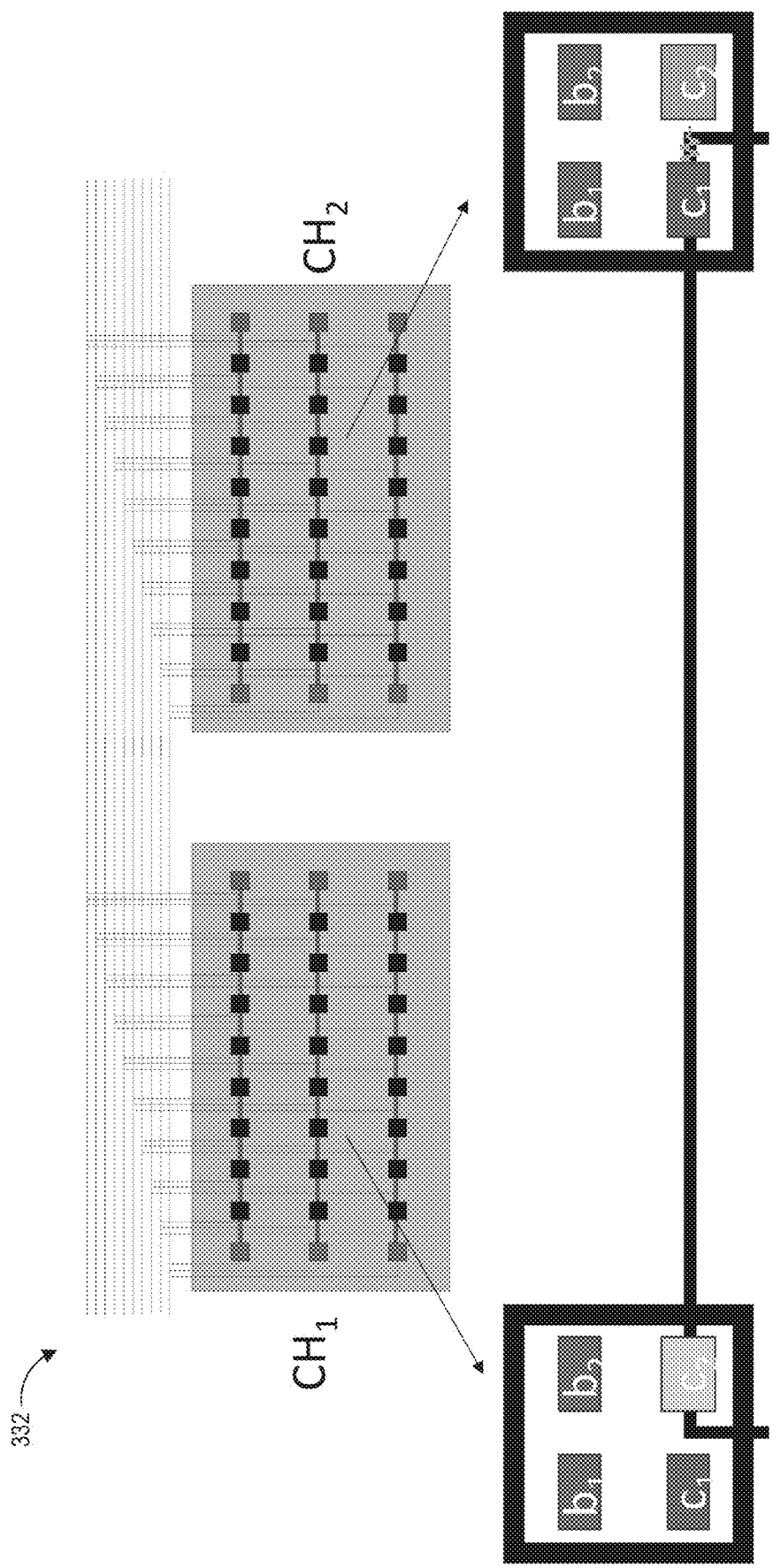
Figure 11C:
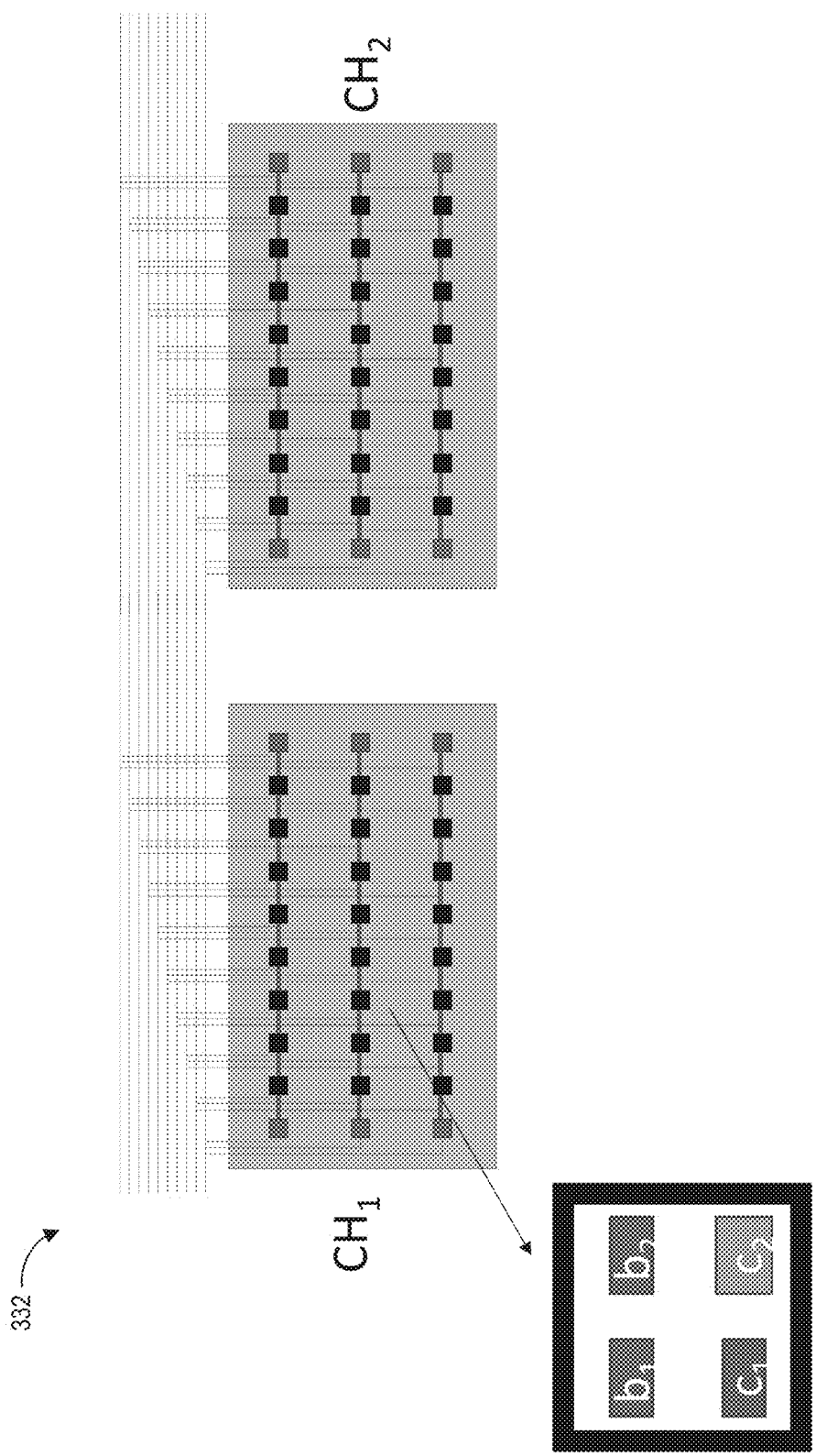

FIGS. 11A-11C illustrate the steps involved in an inter-channel addition operation in accordance with aspects of this disclosure. During inter-channel addition, the addition of two pixel processing cores $CH_1$ and $CH_2$ onto the first pixel processing core $CH_1$ is performed. Although an example is discussed with reference to a bit addition of a single bit, bits of the channels can be added in parallel.

In a first step 330 corresponding to FIG. 11A, the first buffer $b_1$ of a bit processing core of the first pixel processing core $CH_1$ is copied to the corresponding second computing circuit $c_2$. The first buffer $b_1$ of a bit processing core of the second pixel processing core $CH_2$ is copied to the corresponding first computing circuit $c_1$. This can happen in parallel for all bit computing core of the pixel processing cores $CH_1$ and $CH_2$ or restricted to channels of $CH_1$ and $CH_2$.

In a second step 332 corresponding to FIG. 11B, the second computing circuit $c_2$ of the bit processing core occupying position p in the channel c of the first pixel processing core $CH_1$ is connected to the first computing circuit $c_1$ of the bit processing core 214 occupying position p in the channel c of the second pixel processing core $CH_2$ to add the values of these two computing circuits and store the resulting value on the second computing circuit $c_2$ of the bit processing core of the first pixel processing core $CH_1$. This operation follows the evolution 302. In a third step 334 corresponding to FIG. 11C, the same process as the second step 304 for performing intra-channel addition as shown in FIG. 8B is performed on the bit processing core of the first pixel processing core $CH_1$.

FIGS. 12A-12C illustrate circuit elements which can be used to implement the buffers $b_1$ and $b_2$ and computing circuits $c_1$ and $c_2$ of a bit processing core in accordance with aspects of this disclosure. These figures illustrate example circuitry that can implement a bit processing core. In particular, in some embodiments, each of the buffers $b_1$ and $b_2$ can be implemented as a D flip flop 402 as shown in FIG. 12A. In some embodiments, the first computing circuit $c_1$ can be implemented as a memory gate 404 as shown in FIG. 12B. The memory gate 404 can have two effective resistance states that depend on a last amount of charge flowing through the memory gate 404. The memory gate 404 can retain its state without power. FIG. 12C illustrates an embodiment of the second computing circuit $c_2$ which can include a memory gate 404 and a JK flip flop 406. Although specific example components have been illustrated in FIGS. 12A-12C, in some other implementations the buffers $b_1$ and $b_2$ and computing circuits $c_1$ and $c_2$ can be implemented with different components. For example, the buffers $b_1$ and $b_2$ can be implemented by a circuit configured to implement the functionality of a D flip flop or any other suitable state element, the first computing circuit $c_1$ can be implemented by a first circuit configured to implement the functionality of a memory gate, and the second computing circuit $c_2$ can be implemented by a circuit configured to implement the functionality of a memory gate and a circuit configured to implement the functionality of a JK flip flop. Any other suitable circuitry can alternatively or additionally be implemented for a bit processing core.

Figure 13:
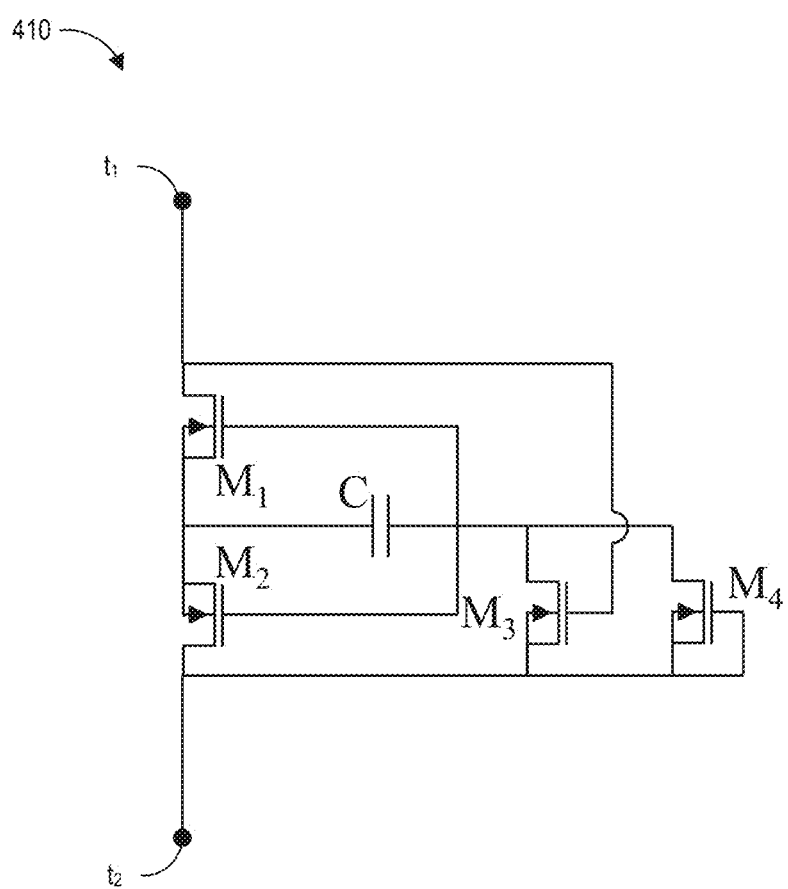
FIG. 13 illustrates an example circuit which can implement a memory gate in accordance with aspects of this disclosure.

FIG. 13 illustrates an example circuit 410 which can be used to implement the memory gate 404 of FIGS. 12B and 12C in accordance with aspects of this disclosure. A memory gate 404 may be a circuit that functions as or similar to a self-controlling transistor. As shown in FIG. 13, the memory gate 404 includes four transistors $M_1$, $M_2$, $M_3$, $M_4$ and a capacitor C arranged between two terminals $t_1$ and $t_2$. The transistors $M_1$-$M_4$ may be implemented as field-effect transistors (FETs), such as metal-oxide-semiconductor field-effect transistor (MOSFETs). Other transistor types can also be used. The first and second transistors $M_1$ and $M_2$ are connected between the terminals $t_1$ and $t_2$ with their source terminals connected together. The third and fourth transistors $M_3$ and $M_4$ have their sources connected to the second terminal $t_2$ and their drains connected to the one end of the capacitor C, which is also connected to the gates of the first and second transistors $M_1$ and $M_2$. The other end of the capacitor is connected to the sources of the first and second transistors $M_1$ and $M_2$. The gate of the third transistor $M_3$ is connected to the first terminal $t_1$ while the gate of the fourth transistor $M_4$ is connected to the second terminal $t_2$. The circuit shown in FIG. 13 is one implementation of a memory gate 404 and other implementations are also possible without departing from aspects of this disclosure.

Figure 14:
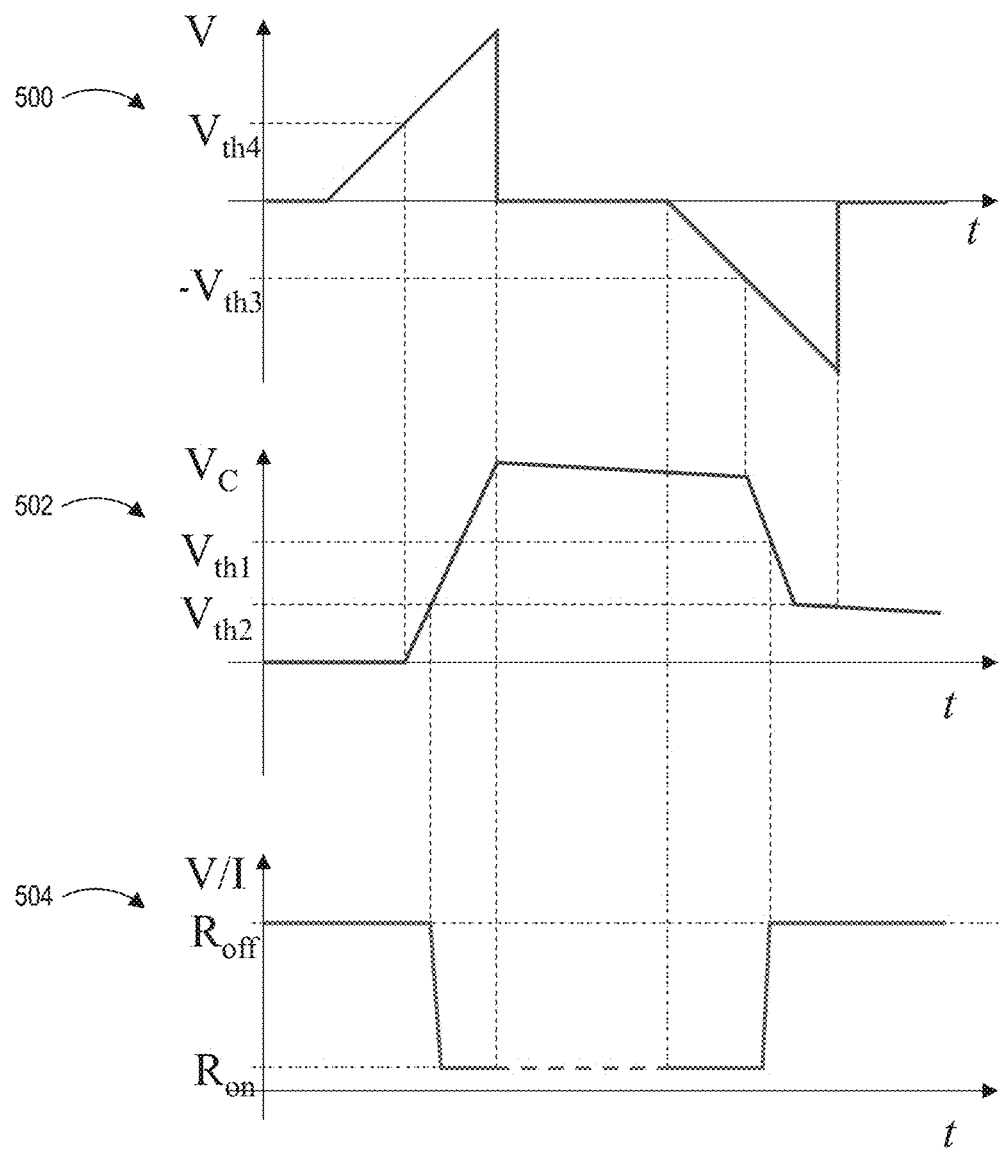
FIG. 14 illustrates certain characteristics of the memory gate of FIG. 13 in response to voltages applied across its terminals $t_1$ and $t_2$ in accordance with aspects of this disclosure.

The memory gate 404 can be configured to switch between ON and OFF (e.g., conductive and non-conductive) states when a voltage is applied across the terminals $t_1$ and $t_2$. FIG. 14 illustrates certain characteristics of the memory gate 404 in response to voltages applied across its terminals $t_1$ and $t_2$ in accordance with aspects of this disclosure. The response of the memory gate 404 to applied voltages may depend on the direction of the applied voltage, as discussed herein. In particular, FIG. 14 includes a first graph 500 illustrating a voltage applied between the terminals $t_1$ and $t_2$ of the memory gate 404 (where a positive voltage indicates that the potential at terminal $t_1$ is greater than the potential at terminal $t_2$), a second graph 502 illustrating the voltage across the capacitor C, and a third graph illustrating the resistance (V/I) of the memory gate 404.

The memory gate 404 begins in the OFF state having a high resistance indicated by $R_{off}$. As the voltage applied to the memory gate 404 increases above the threshold voltage $V_{th4}$ of the fourth transistor $M_4$, the fourth transistor $M_4$ is turned on and the applied voltage begins charging the capacitor C. When the voltage across the capacitor $V_C$ reaches the threshold voltage $V_{th2}$ of the second transistor $M_2$, the memory gate 404 transitions to the ON state having a low effective resistance indicated by $R_{on}$. Even when the voltage applied to the memory gate 404 is removed, the memory gate 404 remains in the ON state due to the stored charge on the capacitor C that keeps the first and second transistors $M_1$ and $M_2$ open.

As the voltage applied to the memory gate 404 decreases to a negative voltage below the threshold voltage $V_{th3}$ of the third transistor $M_3$, the fourth transistor $M_3$ is turned on and the applied voltage begins discharging the capacitor C. When the voltage across the capacitor $V_C$ reaches the threshold voltage $V_{th1}$ of the first transistor $M_1$, the memory gate 404 transitions to the OFF state having a high resistance indicated by $R_{off}$.

Figure 15:
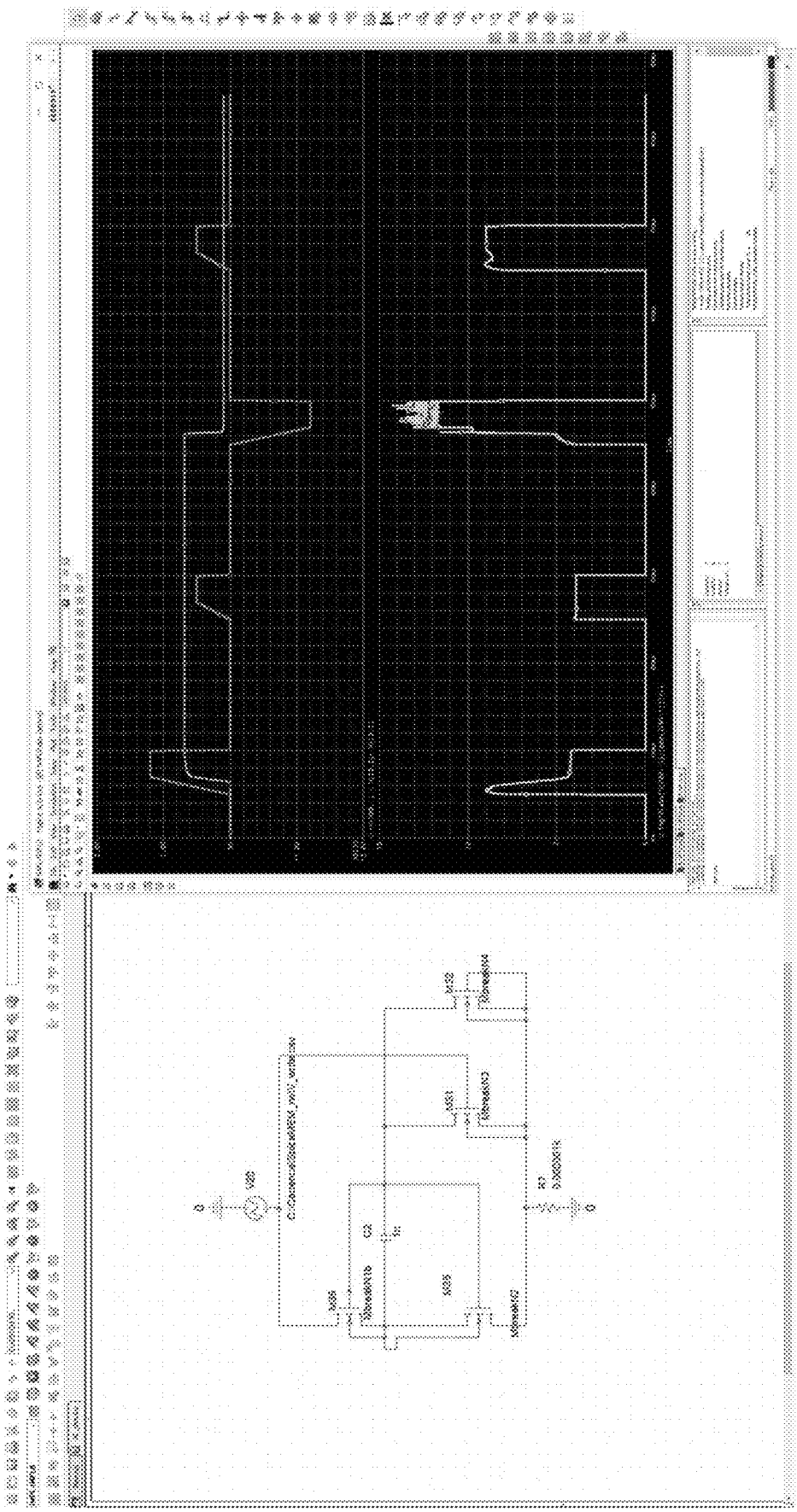
FIG. 15 provides a PSPICE simulation of the memory gate illustrated in FIGS. 13-14.

FIG. 15 provides a PSPICE simulation of the memory gate 404 illustrated in FIGS. 13-14. As shown, the simulated memory gate 404 performs as expected.

When two memory gates 404 are connected together, the memory gates 404 may respond in a non-linear fashion, which can be leveraged as part of the computing circuits' $c_1$ and $c_2$ functionality for implementing binary operations. For example, the applied voltages can be used to perform Boolean operations like OR of the data from a first memory gate 404 and a second memory gate 404 without affecting the state of the first memory gate 404 and storing the result on the second memory gate 404. The threshold voltage level for the operation OR between connected memory gates 404 may be higher than the threshold voltage $V_{th}$, but less than twice the threshold $2V_{th}$ in certain implementations.

Figure 16A:
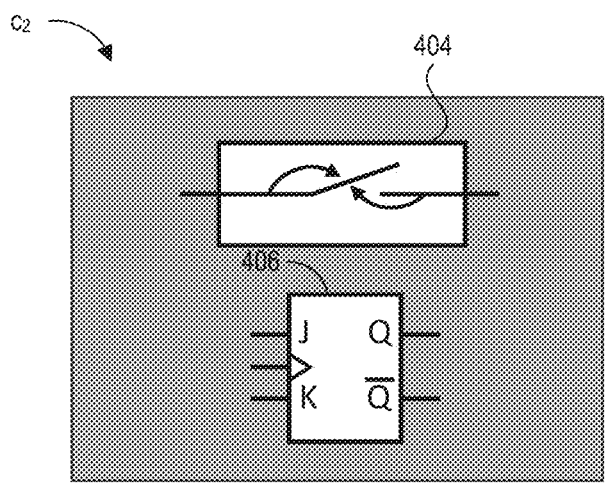
FIGS. 16A-16D illustrate three states of the second computing circuit of FIG. 12C in accordance with aspects of this disclosure.
Figure 16B:
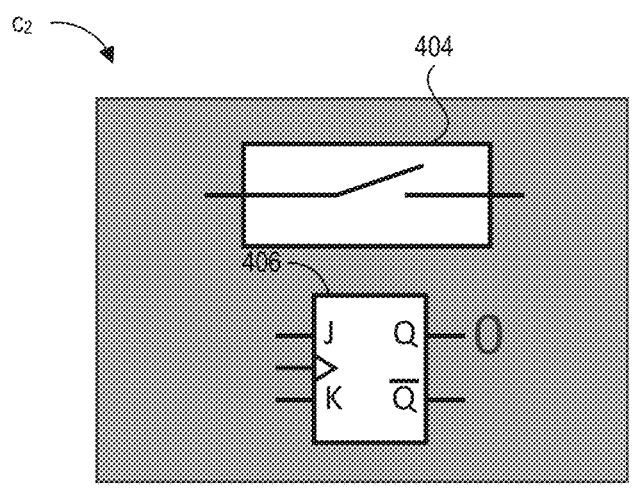
Figure 16C:
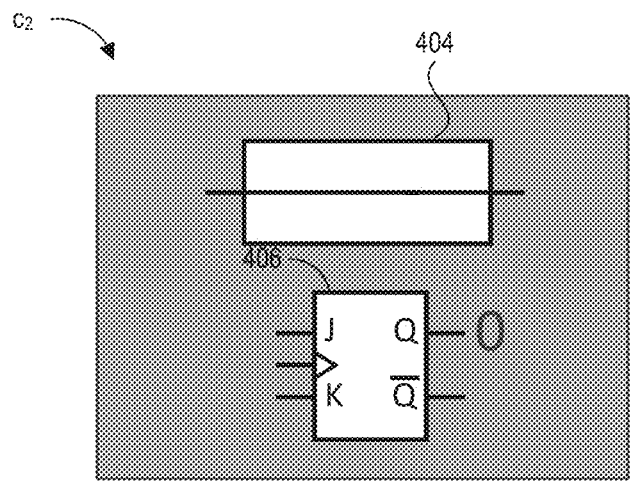
Figure 16D:
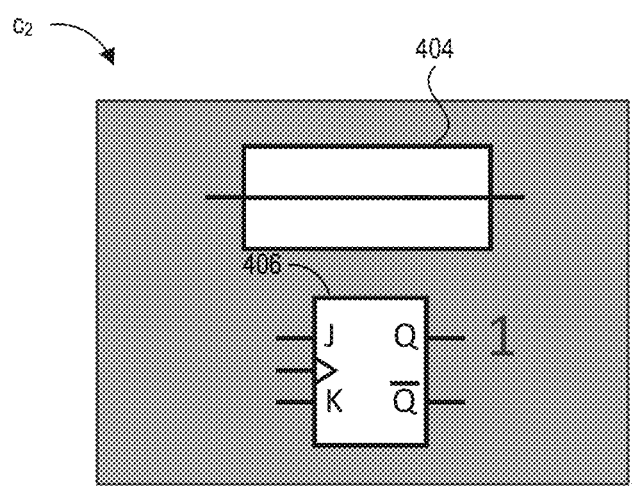

FIGS. 16A-16D illustrate the three states of the second computing circuit $c_2$ of a bit processing core in accordance with aspects of this disclosure. FIG. 16A illustrates the second computing circuit $c_2$ without any state information shown. FIG. 16B illustrates the second computing circuit $c_2$ in a first state in which the value zero is stored on the JK flip flop 406 and the memory gate 404 is open (e.g., has a high resistance). FIG. 16C illustrates the second computing circuit $c_2$ in a second state in which the value zero is stored on the JK flip flop 406 and the memory gate 404 is closed (e.g., has a low resistance). FIG. 16D illustrates the second computing circuit $c_2$ in a third state in which the value one is stored on the JK flip flop 406 and the memory gate 404 is closed (e.g., has a low resistance).

Figure 17A:
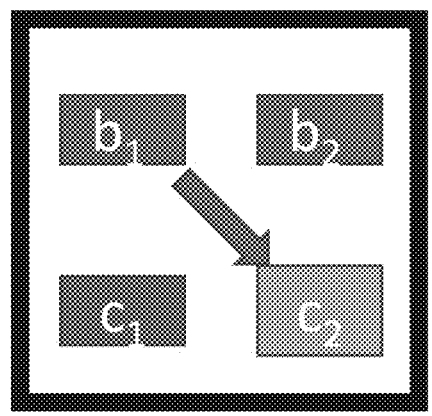
FIGS. 17A and 17B illustrate a copy operation of a bit processing core in which data is copied from a first buffer to a second computing circuit in accordance with aspects of this disclosure.
Figure 17B:
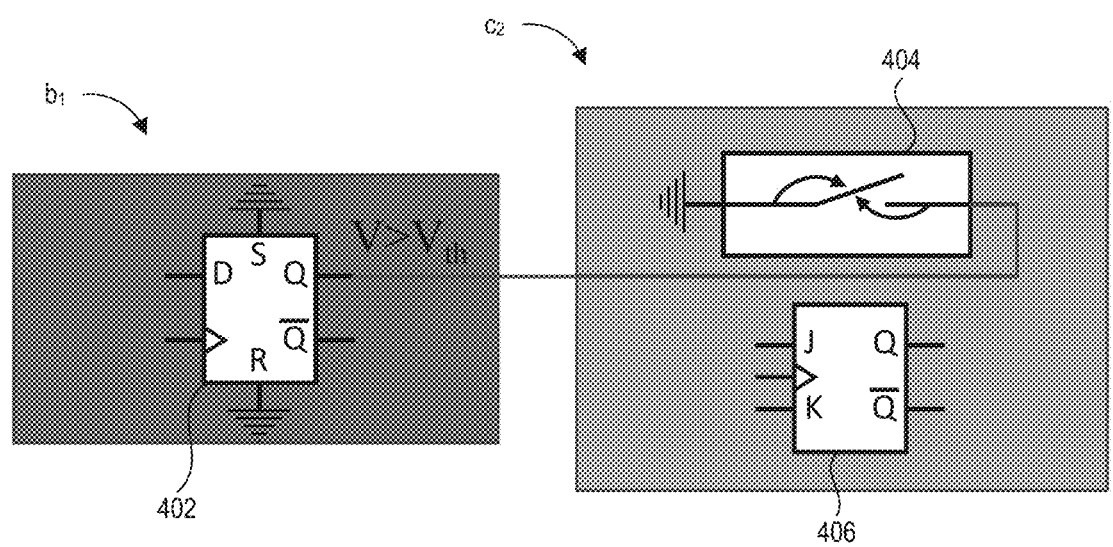

FIGS. 17A and 17B illustrate a copy operation (also referred to as "bit processing core internal copy") in which data is copied from the first buffer $b_1$ to the second computing circuit $c_2$ of a bit processing core in accordance with aspects of this disclosure. In particular, FIG. 17A illustrates the direction in which data is copied from the first buffer $b_1$ to the second computing circuit $c_2$. FIG. 17B illustrates the connections between the first buffer $b_1$ to the second computing circuit $c_2$ to achieve this operation. Prior to the copy operation, the memory gate 404 and the JK flip flop 406 of the second computing circuit $c_2$ are reset to zero. The Q output of the is D flip flop 402 is connected to the memory gate 404 as shown in FIG. 17B. The voltage at the Q output when the first buffer $b_1$ has a value of one is greater than the threshold voltage $V_{th}$ so that the memory gate 404 can be turned ON. The voltage at the Q output when the first buffer $b_1$ has a value of zero is less than the threshold voltage $V_{th}$ so that the memory gate 404 is not turned ON.

Figure 18A:
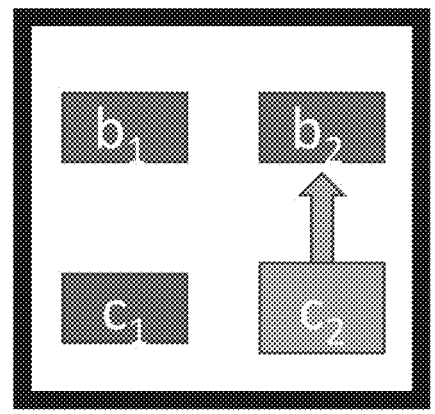
FIGS. 18A and 18B illustrate a copy operation of a bit processing core in which data is copied from a second computing circuit to a buffer in accordance with aspects of this disclosure.
Figure 18B:
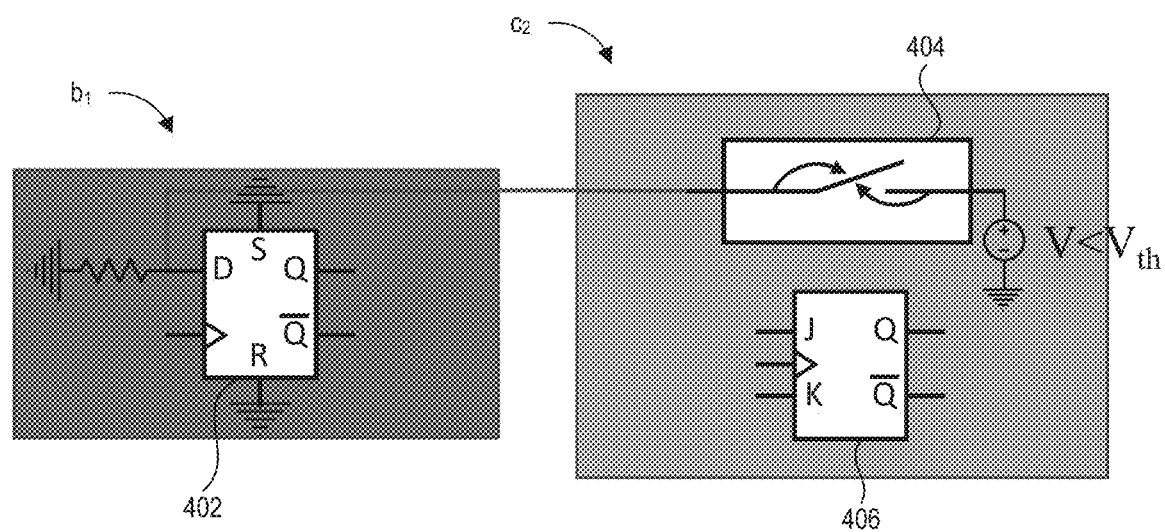

FIGS. 18A and 18B illustrate a copy operation in which data is copied from the second computing circuit $c_2$ to the first buffer $b_1$ in a bit processing core in accordance with aspects of this disclosure. In particular, FIG. 18A illustrates the direction in which data is copied from the second computing circuit $c_2$ to the first buffer $b_1$. FIG. 18B illustrates the connections between the first buffer $b_1$ to the second computing circuit $c_2$ to achieve this operation. The memory gate 404 is connected to the D input of the D flip flop 402 as shown in FIG. 18B. A voltage less than the threshold voltage $V_{th}$ is applied to the other end of the memory gate 404 so that the memory gate 404 can output its stored value without affecting the value stored on the memory gate 404.

Figure 19A:
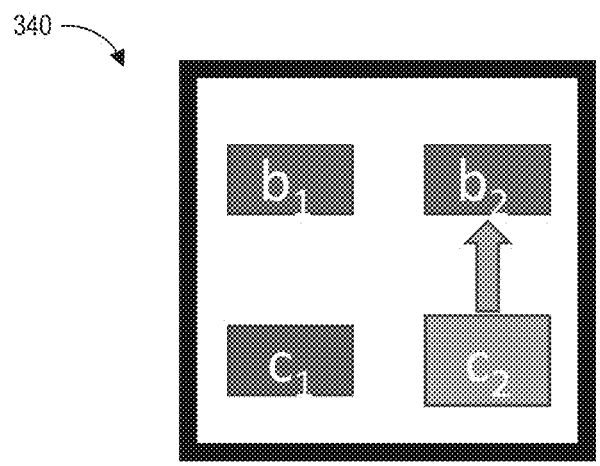
FIGS. 19A-19C illustrate a channel right shift operation for channels of a pixel processing core in accordance with aspects of this disclosure.
Figure 19B:
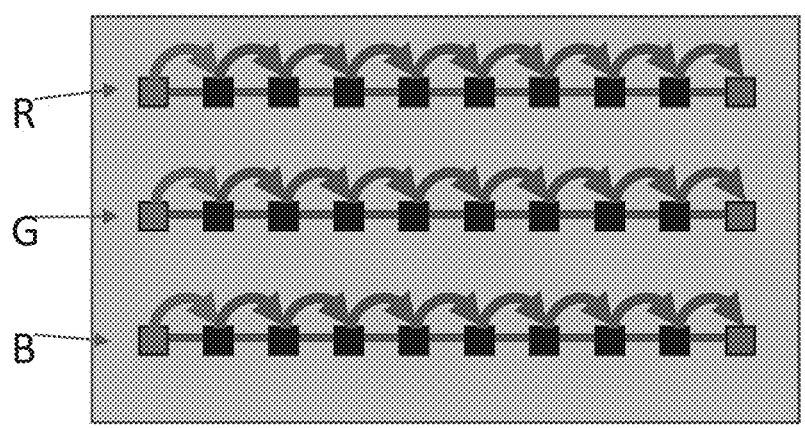
Figure 19C:
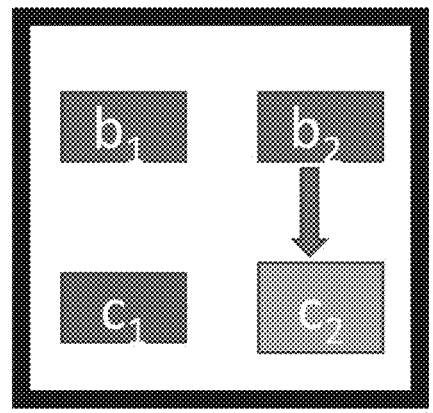

FIGS. 19A-19C illustrate a channel right shift operation for a pixel processing core and the corresponding second computing circuits $c_2$ in accordance with aspects of this disclosure. Both channel right shift and channel left shift operations are performed using shift for the D flip flops 402 in the second buffers $b_2$. If the shift is performed for the values stored in the computing circuits $c_1$ or $c_2$, the bit is first copied to the second buffer $b_2$, the data is then shifted on the second buffers $b_2$, and the shifted data is copied back to the corresponding computing circuit $c_1$ or $c_2$.

FIG. 19A illustrates a first step 340 in which the data stored on the second computing circuit $c_2$ is moved to the second buffer $b_2$ in a bit processing core. In a second step 342 illustrated in FIG. 19B, the data on each second buffer $b_2$ is shifted to the second buffer $b_2$ of the adjacent right bit processing core in a channel of a pixel processing core. In FIG. 19C, the data is copied from the second buffer $b_2$ back to the second computing circuit $c_2$ of a bit processing core after the data is received from the adjacent bit processing core of the channel.

Figures 20A, 20B:
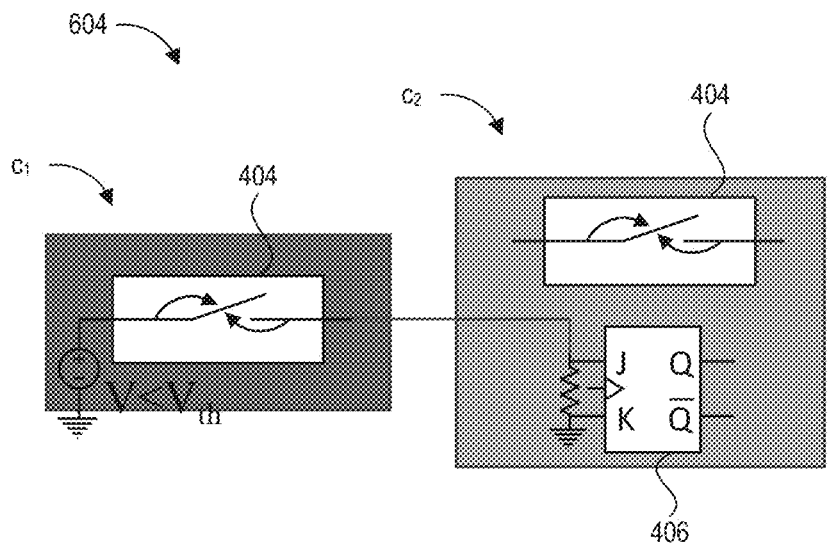
FIGS. 20A-20H illustrate sub-steps for performing the first step for intra-channel addition of FIG. 8A in accordance with aspects of this disclosure.

FIGS. 20A-20H illustrate sub-steps for performing the first step 302 for intra-channel addition of FIG. 8A in accordance with aspects of this disclosure. In particular, FIG. 20A illustrates example state evaluation rules 602 for a first sub-step 604. FIG. 20B illustrates the internal connections between the first and second computing circuits $c_1$ and $c_2$ to execute the first sub-step 604. For FIGS. 20A-20H, $M_1$ represents the state of the memory gate 404 of the first computing circuit $c_1$, $M_2$ represents the state of the memory gate 404 of the memory gate 404 of the second computing circuit $c_2$, and F represents the state of the JK flip flop 406.

Prior to performing the first sub-step 604, the JK flip flop 406 is initialized to zero. In the first sub-step 604, the memory gate 404 of the first computing circuit $c_1$ is connected to the J input of the JK flip flop 406 of the second computing circuit $c_2$ to copy the data from the memory gate 404 of the first computing circuit $c_1$ to the JK flip flop 406 of the second computing circuit $c_2$.

Figures 20C, 20D:
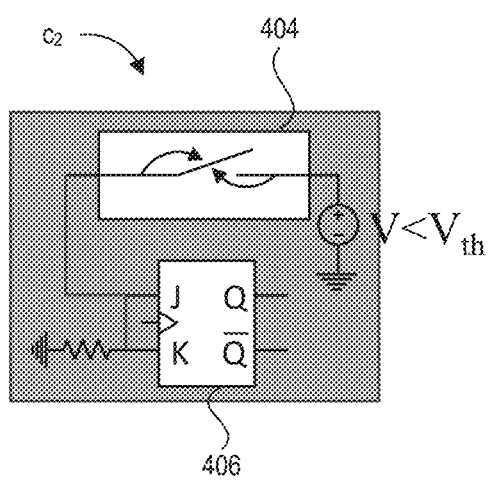

FIG. 20C illustrates example state evaluation rules 606 for a second sub-step 608 and FIG. 20D illustrates the internal connections within the second computing circuit $c_2$ to execute the second sub-step 608. In the first sub-step 608, the memory gate 404 receives a voltage less than a threshold voltage $V_{th}$ and is connected to both the J and K inputs of the JK flip flop 406 to toggle the JK flip flop 406 if the value stored on the memory gate 404 is one and to make no change to the state of the JK flip flop 406 if the value stored on the memory gate 404 is zero.

Figures 20E, 20F:
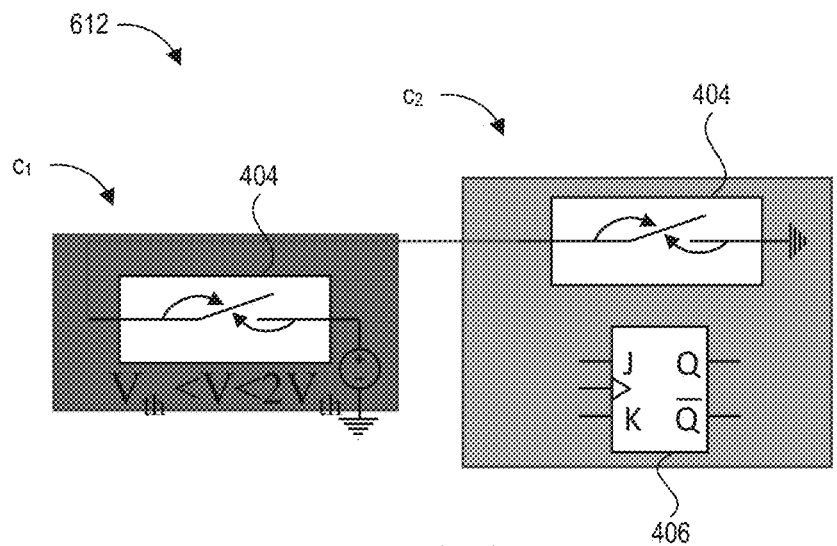

FIG. 20E illustrates example state evaluation rules 610 for a third sub-step 612 and FIG. 20F illustrates the internal connections between the first and second computing circuits $c_1$ and $c_2$ to execute the third sub-step 612. In the third sub-step 612, the memory gate 404 of the first computing circuit receives a voltage greater than a threshold voltage $V_{th}$ and less than a second threshold voltage $2V_{th}$ and is connected to the memory gate 404 of the second computing circuit $c_2$. Accordingly, the memory gate 404 of the second computing circuit $c_2$ is written with the value one if either or both of the memory gates 404 has a value of one and is not change if both memory gates 404 have the value of zero. The memory gate 404 of the first computing circuit $c_1$ is unchanged in the third sub-step 612.

When two memory gates 404 are connected together as shown in FIG. 20F, applying a voltage that is greater than a threshold voltage $V_{th}$ and less than a second threshold voltage $2V_{th}$ does not overwrite the first memory gate 404 applied with the voltage, but does write a value of one to the second memory gate 404 when the first memory gate 404 has a value of one. When the first memory gate 404 has a value of zero, the voltage between the two thresholds $V_{th}$ and $2V_{th}$ does is not sufficient to change the value of either memory gate 404.

Figures 20G, 20H:
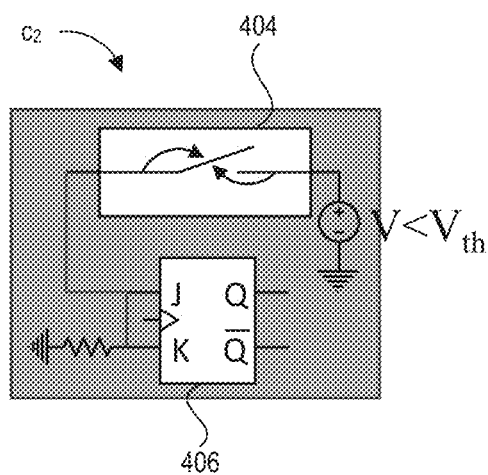

FIG. 20G illustrates example state evaluation rules 614 for a fourth sub-step 616 and FIG. 20H illustrates the internal connections within the second computing circuit $c_2$ to execute the fourth sub-step 616. In the fourth sub-step 616, the memory gate 404 receives a voltage less than a threshold voltage $V_{th}$ and is connected to both the J and K inputs of the JK flip flop 406 to toggle the JK flip flop 406 if the value stored on the memory gate 404 is one and to make no change to the state of the JK flip flop 406 if the value stored on the memory gate 404 is zero.

As can be seen from FIGS. 20A-20H and the above description, the four sub-steps 604, 608, 612, and 616 together implement the state evaluation rules for the first step 302 of intra-channel addition illustrated in FIG. 8A. The second computing circuit $c_2$ can store the result of the intra-channel add with $M_2$ representing a sum bit and F representing a carry bit for adding binary values stored by the memory gates of first and second computing circuits $c_1$ and $c_2$.

Figure 21A:
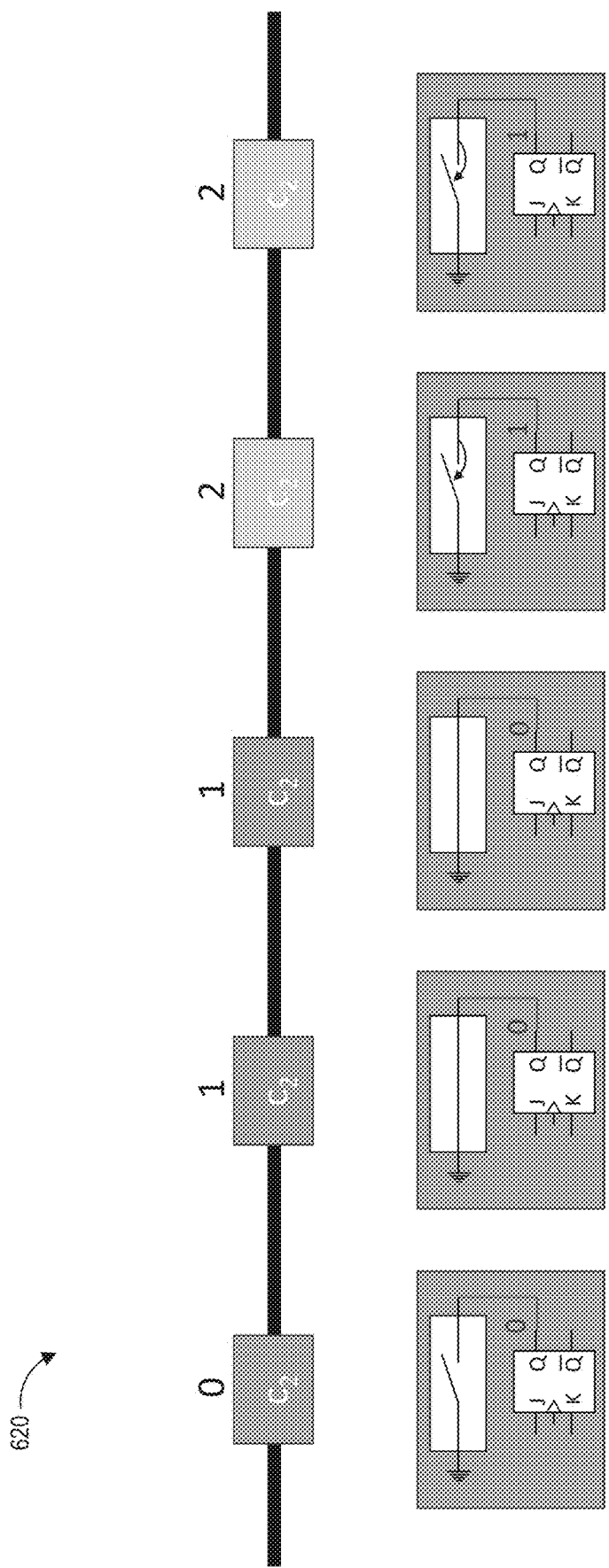
FIGS. 21A-21D illustrate sub-steps for performing the second step for intra-channel addition of FIG. 8B in accordance with aspects of this disclosure.

FIGS. 21A-21D illustrate sub-steps for performing the second step 304 for intra-channel addition of FIG. 8B in accordance with aspects of this disclosure. In particular, FIG. 21A illustrates an example initial state for each of a plurality of second computing circuits $c_2$ for adjacent bit processing cores. These values are merely examples and intra-channel addition can be performed for any data stored on the second computing circuits $c_2$. Each second computing circuits $c_2$ stores a value of 0, 1, or 2. In the first sub-step 620, the second computing circuits $c_2$ perform a release operation in which the second computing circuits $c_2$ that are in state 2 will have its memory gate 404 switch from 1 to 0 and all other memory gates 404 will remain unchanged.

Figure 21B:
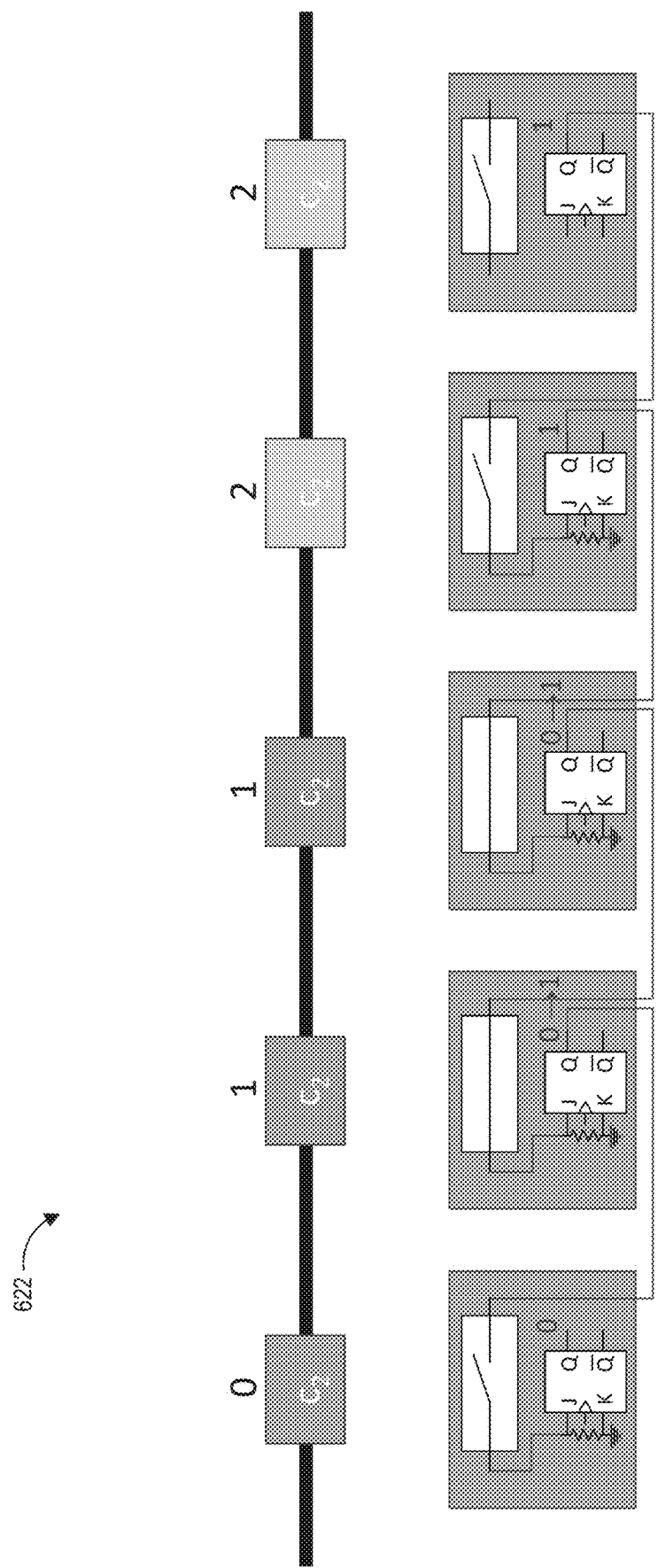

FIG. 21B illustrates a second sub-step 622 for the second step 304 for intra-channel addition. In the second sub-step 622 involves passing the Q output of the previous JK flip flop 406 through the memory gate 404 and into the J input of the JK flip flop 406 of the current computing circuit $C_2$.

Figure 21C:
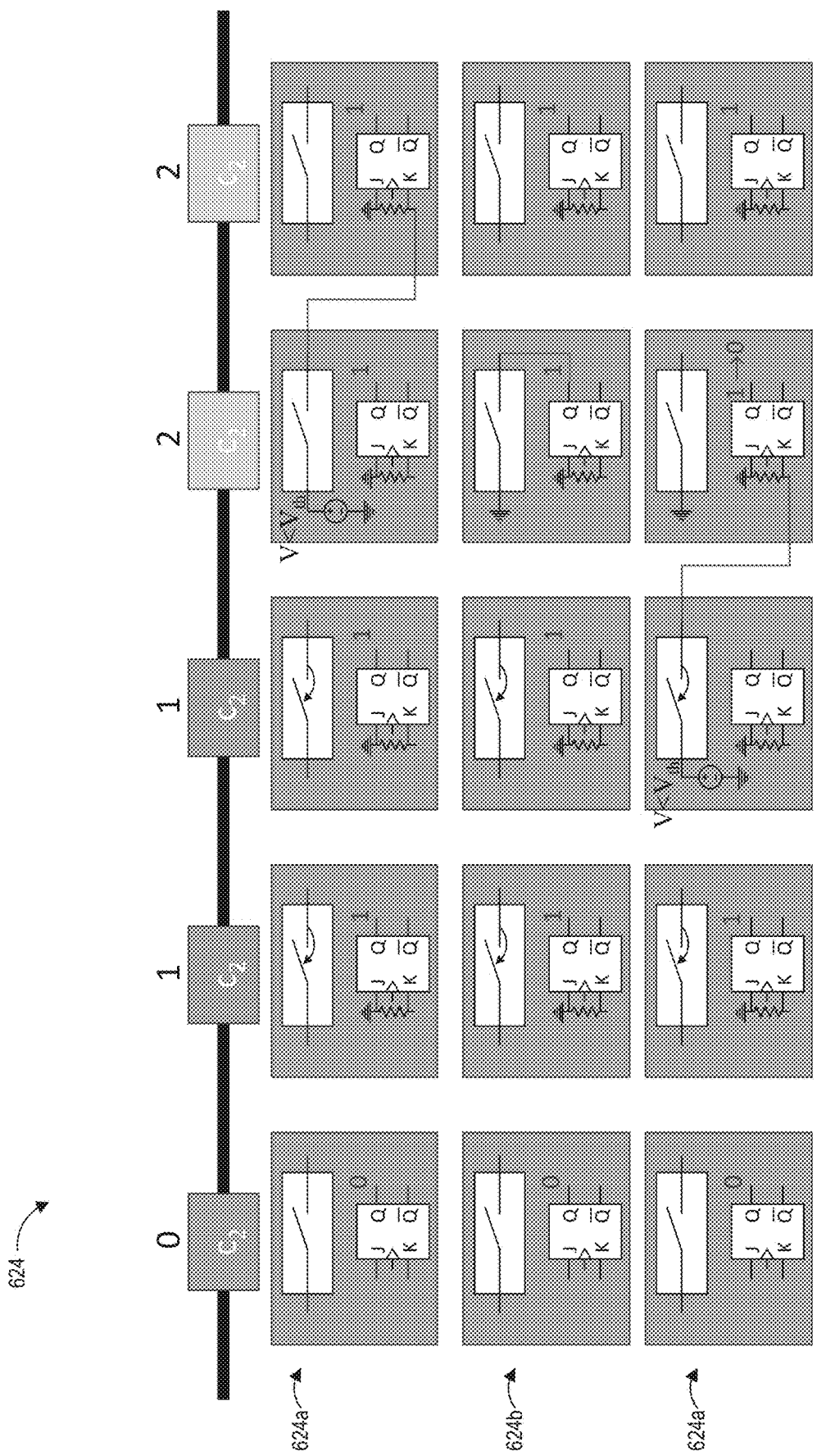
Figure 21D:
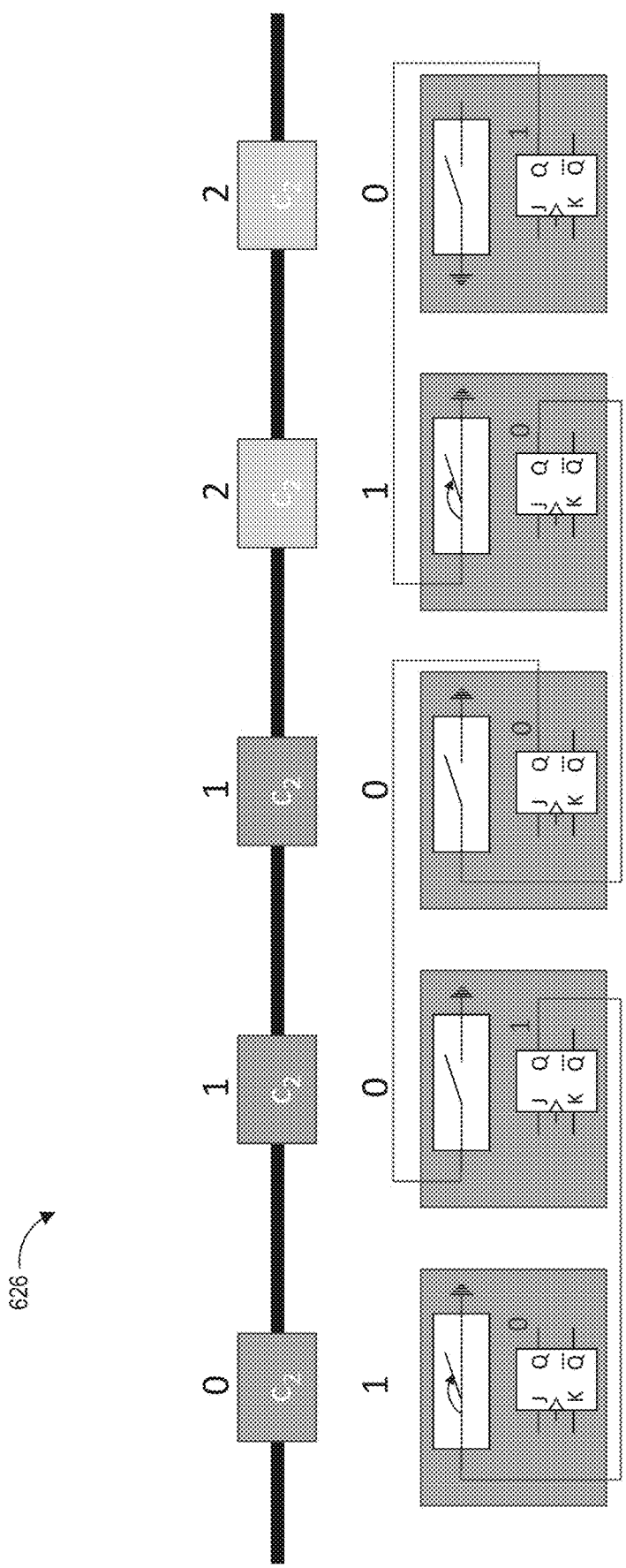

In the third sub-step 624, a portion of which is illustrated in FIG. 21C, a sequence of the memory gates 404 are driven K-JK-set alternated by the release operation. The sequence includes a first operation 624a and a second operation 624b, which are repeated in sequence as illustrated by the first operation 624a being repeated. In sequence are performed the operations starting from the rightmost second computing circuit $c_2$ finishing to the leftmost second computing circuit $c_2$. In the first operation 624a, the K terminal of the JK flip flop of the previous second computing circuit $c_2$ is connected to the right terminal of the memory gate of the next second computing circuit $c_2$ and a voltage smaller than $V_{th}$ is applied to the other terminal. This will change the state of the JK flip flop if the memory gate is in the conducting state. Subsequently, in the second operation 624b, the release is performed internally to the second computing circuit $c_2$ by connecting the Q terminal of the JK flip flop to the right terminal of the memory gate and connecting the other terminal at the ground. These operations 624a and 624b are performed in sequence starting from the rightmost second computing circuit $c_2$. FIG. 21D illustrates the fourth sub-step in which the memory gates 404 are set from the Q output of the previous JK flip flop 406.

Figure 22:
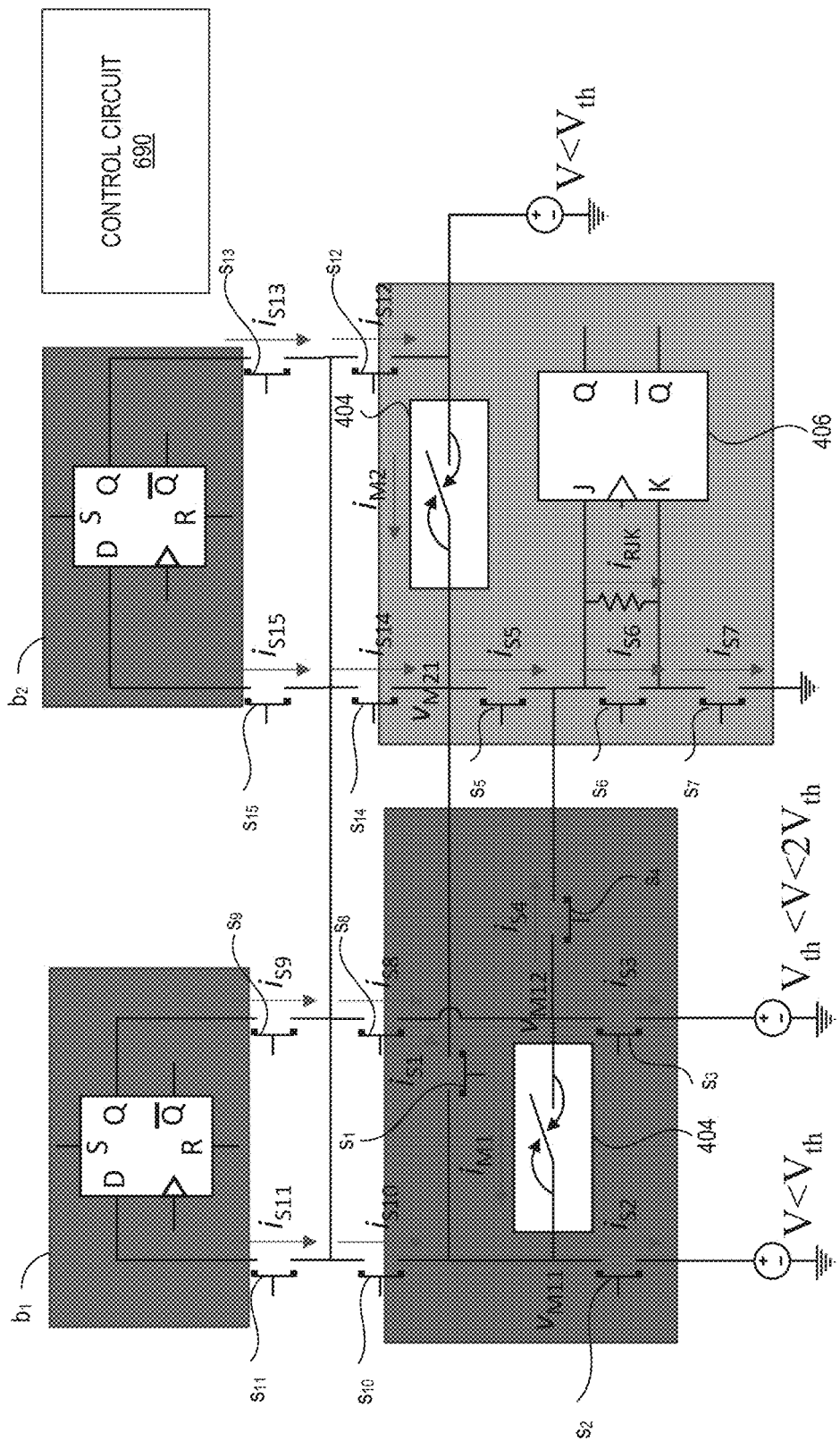
FIG. 22 illustrates a detailed embodiment of first and second computing circuits and control transistors that can be used to selectively connect memory gates and a JK flip flop in order to perform binary operations in a bit processing core in accordance with aspects of this disclosure.

FIG. 22 illustrates a detailed embodiment of the first and second buffers $b_1$ and $b_2$, the computing circuits $c_1$ and $c_2$ and the control transistors $s_1$-$s_{15}$ that can be used to selectively connect elements of the first and second buffers $b_1$ and $b_2$ and the computing circuits $c_1$ and $c_2$ in a bit processing core. For example the D flip flops 402 and the memory gates 404 can be selectively electrically connected by the control transistors $s_1$-$s_{15}$ in order to perform copy operations and bit movements in accordance with aspects of this disclosure. For example, the memory gates 404 and the JK flip flop 406 can be selectively electrically connected by the control transistors $s_1$-$s_7$ in order to perform binary operations in accordance with aspects of this disclosure. For example, the transistors $s_1$-$s_7$ can selectively connect the memory gates 404 and/or the JK flip flop 406 together as well as selectively connect the memory gates 404 to voltage rails $V<V_{th}$ or $V_{th}<V<2V_{th}$. A control circuit 690 can be used to generate the control signals for turning on and off each of the control transistors $s_1$-$s_{15}$. The control transistors $s_1$-$s_{15}$ can function as switches. Accordingly, control transistors $s_1$-$s_{15}$ can be referred to as switches. The control circuit 690 may be located inside of a bit processing core 214, outside of the bit processing core 214 but inside of a pixel processing core 220, or outside of the pixel processing core 220.

Switches $s_8$-$s_{15}$ can be used to implement all bit copy operation illustrated in FIG. 5B. For example, by closing switches $s_8$ and $s_9$, the first buffer $b_1$ can be copied to the first computing circuit $c_1$. Similarly closing switches $s_9$ and $s_{12}$, the first buffer $b_1$ can be copied to the second computing circuit $c_2$. Closing instead $s_{13}$ switches and $s_{12}$, the second buffer $b_2$ can be copied to the second computing circuit $c_2$ and closing switches $s_{13}$ and $s_8$, the second buffer $b_2$ can be copied to the first computing circuit $c_1$. The switches $s_1$-$s_{15}$ can also be used to copy the computing circuits $c_1$ and $c_2$ to the buffers $b_1$ and $b_2$. For example, closing switches $s_{11}$ and $s_{10}$, the first computing circuit $c_1$ can be copied to the first buffer $b_1$ and closing switches $s_{14}$ and $s_{11}$, the second computing circuit $c_2$ can be copied to the first buffer $b_1$. Similarly closing switches $s_{15}$ and $s_{14}$, the second computing circuit $c_2$ can be copied to the second buffer $b_2$ and closing switches $s_{15}$ and $s_{10}$, the first computing circuit $c_1$ can be copied to the second buffer $b_2$. Switches $s_1$-$s_7$ can be used to implement the inter-connections for performing the four sub-steps 604, 608, 612, and 616 illustrated in FIGS. 20A-20H for performing the first step 302 for intra-channel addition. For example, the first sub-step 604 of FIG. 20B can be accomplished by closing switches $s_2$, $s_4$, and $s_7$. Similarly, the second sub-step 608 of FIG. 20D can be implemented by closing switches $s_5$ and $s_6$. The third sub-step 612 of FIG. 20F can be accomplished by closing switches $s_1$ and $s_3$. Finally, the fourth sub-step 616 of FIG. 20H can be implemented by closing switches $s_5$ and $s_6$. In this way, the switches $s_1$-$s_7$ (and other not illustrated switches) can be used to implement various sub-steps that can be used to perform any processing task 102a-102n implement a desired graphic function 102.

FIGS. 23A-23D provide a plurality of system level simulation results illustrating the change of certain parameters during the first step 302 for intra-channel addition in accordance with aspects of this disclosure. In particular, each of FIGS. 23A-23D includes a first graph 700a-706a illustrating the voltage (V) across the memory gate 404 against time (ns), a second graph 700b-706b illustrating the resistance (V/I) of the memory gate 404 against time (ns), a third graph 700c-706c illustrating the voltage (V) at various points on the JK flip flop 406 against time (ns), and the fourth graph 700ad-706d illustrates the power (nW) and energy (fJ) of the bit processing core 214 against time (ns). The graphs are obtained by system level simulation of the circuit in FIG. 22 using the following parameters for the simulations:

Memory Gate:
$v_{th}$=0.3 V
C=1 fF
Max V/I=10 GΩ
Min V/I=100 MΩ
JK Flip Flop:
$v_{th}$=0.2 V
RJK=2 GΩ
Clock=1 GHz
Switches:
$R_{off}$=10 GΩ
$R_{on}$=10 MΩ

Special Cases:
$R_{on}$ S1,3=1 MΩ
$R_{off}$ S2,3=100 GΩ
$R_{off}$ S7=1 GΩ

Figure 23A:
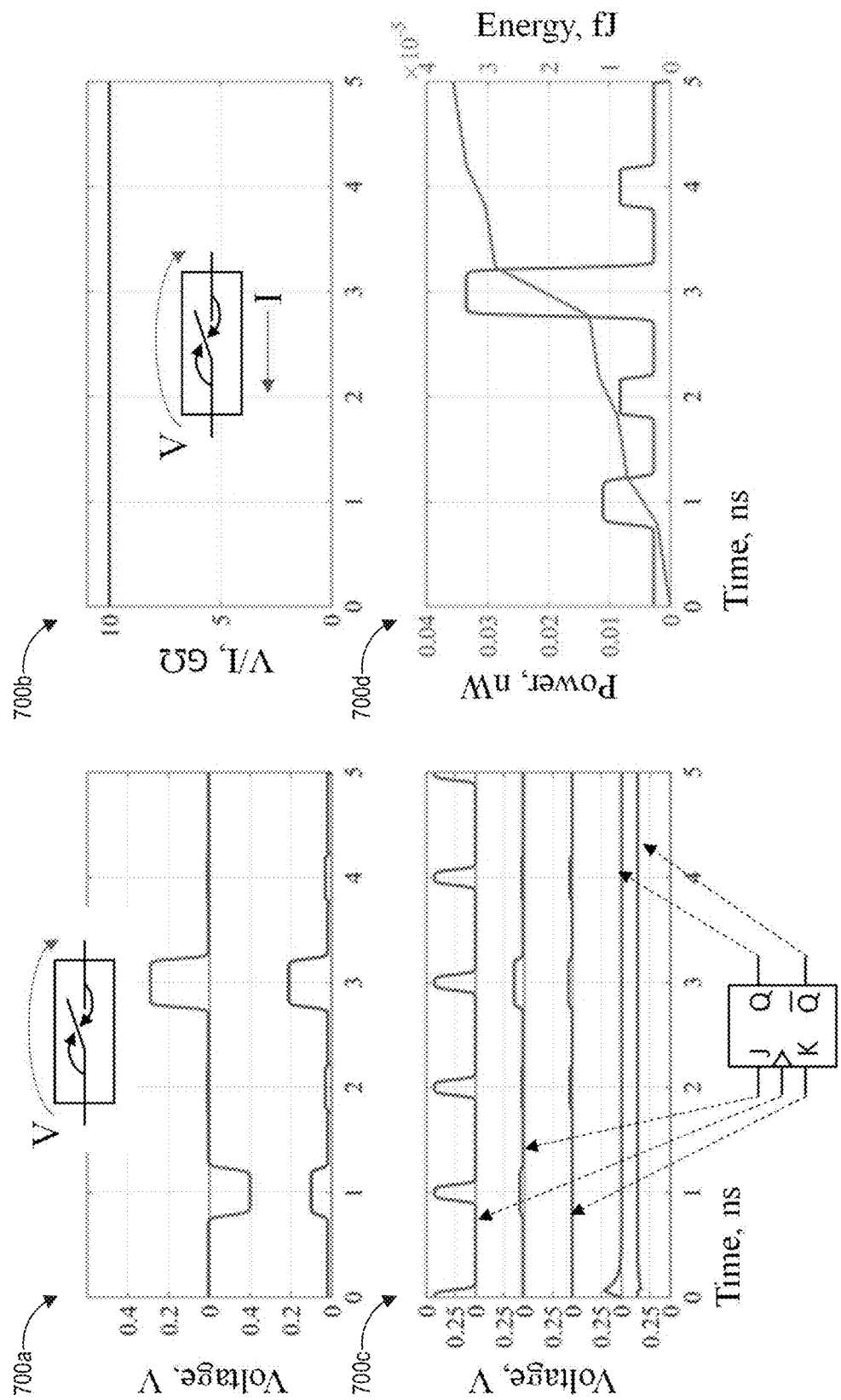
FIGS. 23A-23D provide a plurality of system level simulation results illustrating the change of certain parameters during the first step for intra-channel addition in accordance with aspects of this disclosure.
Figure 23B:
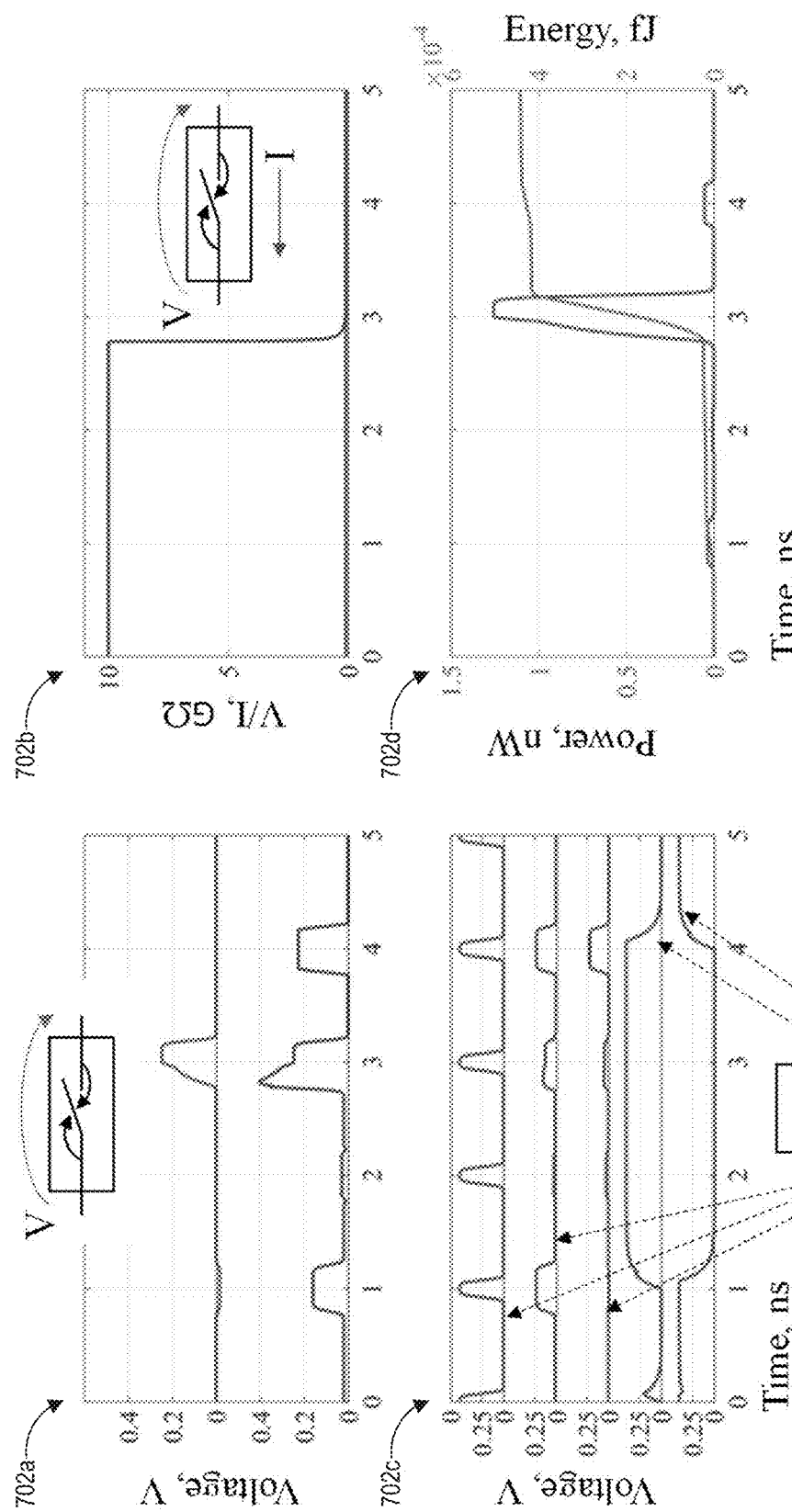
Figure 23C:
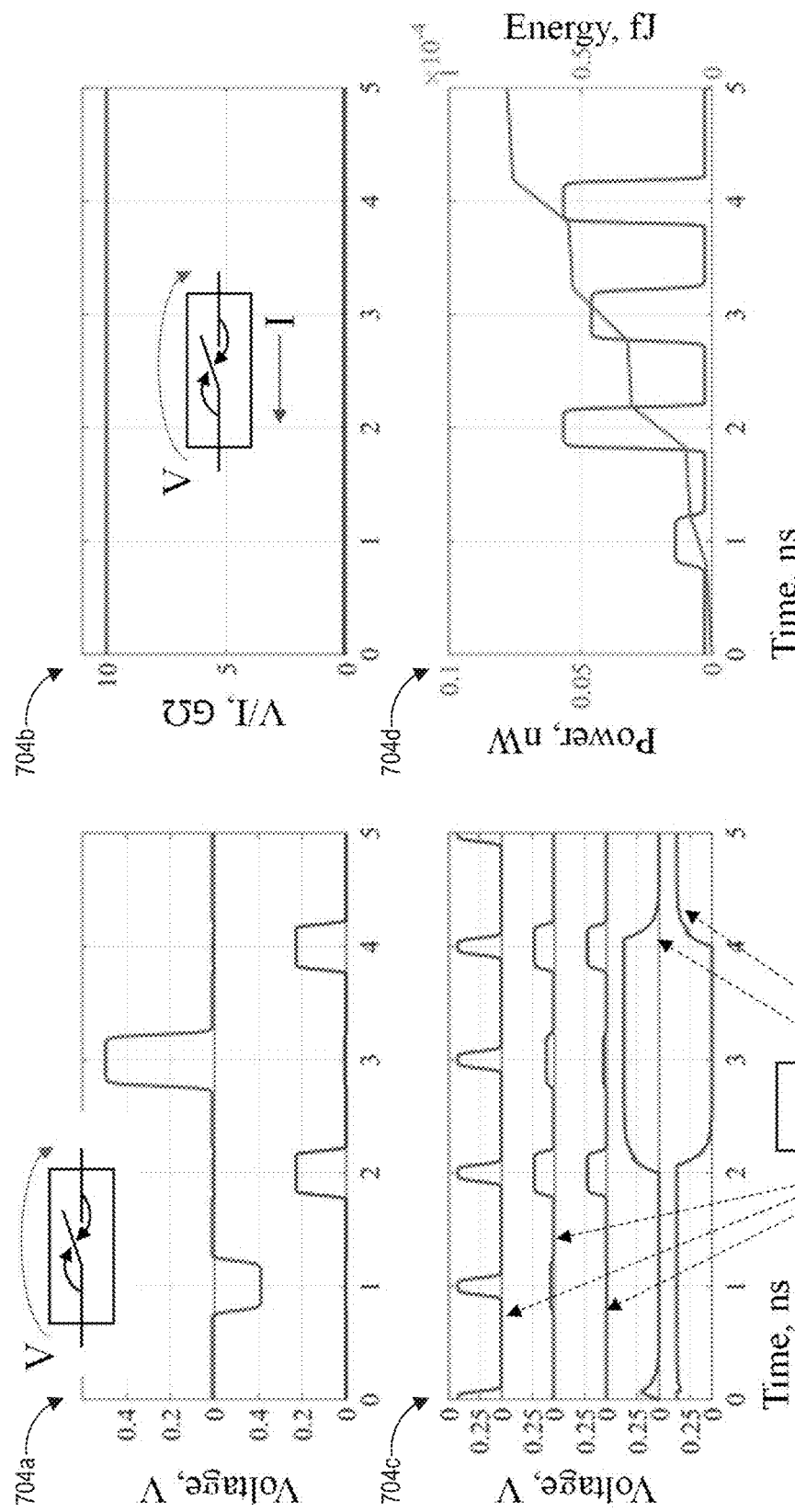
Figure 23D:
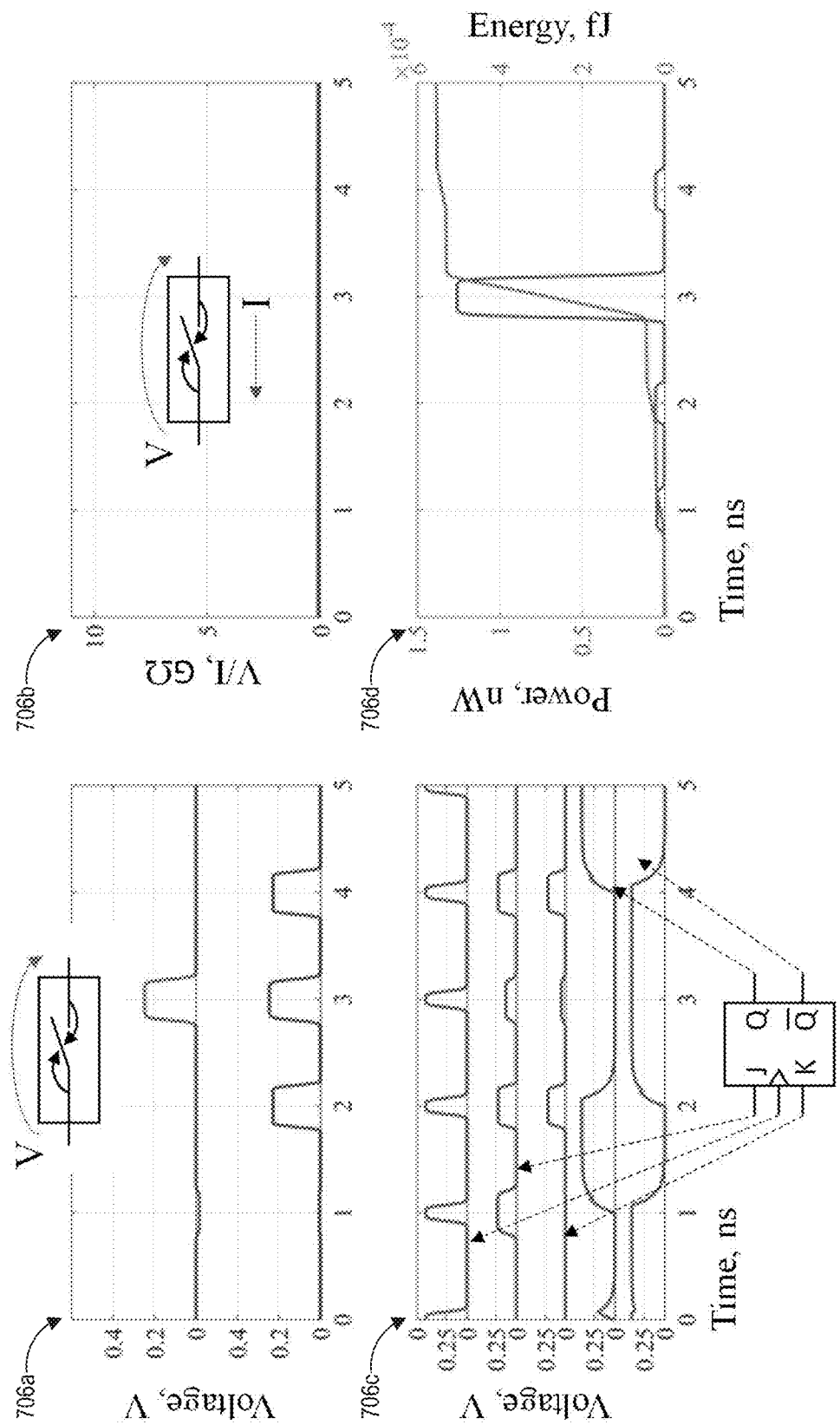

Each of FIGS. 23A-23D illustrates the corresponding parameters for a specific row of the state evaluation rules for the first step 302 for intra-channel addition of FIG. 8A. In particular, FIG. 23A illustrates the first row "0 0→0," FIG. 23B illustrates the second row "1 0→1," FIG. 23C illustrates the third row "0 1→1," and FIG. 23D illustrates the fourth row "1 1→2."

The number of transistors and capacitors according to one embodiment for a bit processing core 214 including the example components illustrated in FIGS. 12A-12C can be determined as follows. Each D flip flop 402 can include 36 transistors, the memory gate 404 in each of the first and second computing circuits $c_1$ and $c_2$ can include four transistors and one capacitor, the JK flip flop 406 can include 18 transistors, and the bit processing core 214 can include 18 transistors for internal switches. Thus, the total number of transistors may be 116 and the total number of capacitors may be 2 to implement the bit processing core 214 according to an example embodiment.

In one embodiment, a pixel processing core 220 can include 14 additional transistors which are used as switches to control connections of the bit processing cores 214 to the inter-channel interconnect lines 228 and the inter-pixel processing core interconnect lines 230. Following this example, a memory GPU 202 configured to process a true color (24 bit) 4 k image can include (24+6)×3840×2160 or about $2.5 \times 10^8$ bit processing cores 214. Using the above transistor and capacitor counts, the example memory GPU 202 would include about $3 \times 10^{10}$ transistors and about $5 \times 10^8$ capacitors. Accordingly, this example memory GPU 202 can be implemented with $O(10^{10})$ transistors like other modern GPUs.

Aspects of this disclosure show integrality of hundreds of millions of bit processing cores 214 on the same chip using modern technology. With the potential processing of high-resolution images, including 4 k resolution and higher with high color depth of 24 bits and higher. Preliminary simulations show that an architecture such as that described herein for the memory GPU 202 can process a 4 k, 24-bit image using 0.025 W of power while performing $8.3 \times 10^{15}$ operations per second. This is thousands of times faster and would consume thousands of times less energy than a traditional GPU.

Writing on the memory GPU 202 consumes similar energy used for SRAMs (e.g. cache). Once an image is written on the memory GPU 202 (e.g., stored in one or more of the buffers $b_1$ and $b_2$) then the image no longer needs to be moved to be processed, thereby eliminating the von Neumann bottleneck. From simulations, the average energy per clock per bit processing core 214 can be $O(10^{-4}$ fJ) for embodiments of the memory GPU 202 described herein.

An example graphic function 102 which can be used to demonstrate the advantages of the memory GPU 202 is Gaussian blur. Gaussian blur can be performed by horizontal and vertical convolutions over the pixels using appropriate coefficients of magnitude<1. The convolution can be performed with a sequence of operation product color*p and inter-channel addition operations on the memory GPU 202. The length of the sequence can depend on the convolution depth σ in number of pixels.

The operation product color*p for Gaussian blur may involve 14×NP clock cycles, while the inter-channel addition for Gaussian blur may involve 10 clock cycles. The total number of clock cycles for Gaussian blur can then be calculated as (the number of operation product color*p clock cycles+the number of inter-channel addition clock cycles)× 4σ. Using the above values, this evaluates to (14×8+10)× 4×10=4880 clock cycles.

By estimating the number of flops used to perform Gaussian blur, the memory GPU 202 according to aspects of this disclosure can be compared to an NVIDIA GPU. The following estimate of the flops to perform a Gaussian blur of depth σ on a 4K images is 4σ×3×#pixel is based on σ=10.

The memory GPU 202 can include $3 \times 10^{10}$ transistors and perform 8300 Tera operations per second. Bandwidth is not applicable due to the design of the memory GPU. This can result in a power consumption of 0.025 W.

NVIDIA GeForce RTX 3080 is understood to include $2 \times 10^{10}$ transistors and perform 18.98 Tflops single precision with a bandwidth of 384 Gbits/s. This results in a power consumption of 115 W, which is about 4600 times the power consumption of the example memory GPU 202.

The amount of time in which Gaussian blur can be performed by the memory GPU 202 can be calculated as #clocks/clock freq=5 µs. The time for this operation does not scale with size for the memory GPU 202.

The amount of time in which Gaussian blur can be performed by NVIDIA GeForce RTX 3080 can be calculated as max(4σ×3×#pixel/18.98 Tflops, #bits/Bandwidths) =50 ms. This is about 10,000 times the time involved in the calculation performed by the memory GPU 202.

Similar calculations and comparisons can be performed for a memory GPU 202 configures to process a 14 bit single color 8 k×8 k image. For example, such a memory GPU 202 can include roughly $1 \times 10^{11}$ transistors and $1.8 \times 10^9$ capacitors. For a clock frequency of 1 GHz with all bit processing cores working in parallel, the total energy for one second can be calculated as about 0.1 J or equivalently about 0.1 W as the average power for a second of work. Gaussian blur can be calculated as involving 8250 clocks.

Comparing the example 8 k memory GPU 202 to NVIDIA GeForce RTX 3080 performing Gaussian blur, the memory GPU 202 can involve using 0.1 W of power, while the NVIDIA GeForce RTX 3080 may use 115 W. Accordingly, in this example, the memory GPU 202 is calculated to achieve a 1,150 times power savings. The time to perform Gaussian blur for the memory GPU 202 may be 10 µs compared to 86 ms for the NVIDIA GeForce RTX 3080. This represents an 8,600 times savings in speed.

CONCLUSION

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including," "comprising," "incorporating," "consisting of," "have," "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A graphics processing unit (GPU) for massive parallel processing of at least part of an image, comprising:
    a plurality of pixel processing cores, each of the pixel processing cores configured to process a pixel of the image, and each of the pixel processing cores comprising a plurality of bit processing cores each configured to process an individual bit of the pixel, each of the bit processing cores comprising internal circuits;
    a plurality of address lines configured to provide access to the bit processing cores; and
    a plurality of interconnect lines configured to connect the bit processing cores,
    wherein the pixel processing cores are configured to process pixels of the image in parallel, and wherein each of the bit processing cores is configured to perform different binary operations on the individual bit of the pixel by selectively connecting: i) the internal circuits within the bit processing core and ii) the bit processing core to an adjacent bit processing core of the bit processing cores via at least one of the plurality of interconnect lines.

2. The GPU of claim 1, wherein the pixel processing cores are configured to process all or substantially all of the pixels of the image in parallel.

3. The GPU of claim 1, wherein the internal circuits of each of the bit processing cores include at least two buffers and at least one computing circuit.

4. The GPU of claim 1, wherein the bit processing cores of each pixel processing core are organized into at least one color channel, the one color channel including a sign bit processing core, a plurality of color channel bit processing cores, and one or more shift operation bit processing cores.

5. The GPU of claim 1, wherein the internal circuits of each of the bit processing cores include two buffers and two computing circuits.

6. The GPU of claim 5, wherein the two buffers and a first computing circuit of the two computing circuits are each two-state elements, and a second computing circuit of the two computing circuits is a three-state element.

7. The GPU of claim 6, wherein each of the buffers is configured to implement functionality of a D flip flop, the first computing circuit comprises a memory gate, and the second computing circuit comprises a memory gate and a state element configured to implement functionality of a JK flip flop.

8. The GPU of claim 1, wherein each of the pixel processing cores is configured to execute one or more: bit processing core internal copy, bit processing core selective reset, channel shift right, channel left shift, intra-channel addition, bit processing core not, or inter-channel addition.

9. The GPU of claim 1, further comprising a plurality of switches configured to connect two or more of the pixel processing cores via the address lines for performing at least a portion of a graphic function.

10. A graphics processing unit (GPU) for massive parallel processing of at least part of an image, comprising:
a plurality of processing cores each configured to process an individual bit of the image, each of the plurality of processing cores comprising electronic circuits configured to store information and to process the information; and
a plurality of interconnect lines configured to connect the plurality of processing cores;
wherein the plurality of processing cores are arranged such that individual pixels of the image are processed in parallel, and
wherein each of the processing cores is configured to perform different binary operations on the individual bit of the pixel by selectively connecting: i) the electronic circuits within the bit processing core and ii) the bit processing core to an adjacent processing core of the processing cores via at least one of the plurality of interconnect lines.

11. The GPU of claim 10, wherein the processing cores are arranged to provide a complete basis of binary operations.

12. The GPU of claim 10, wherein the electronic circuits include two buffers and two computing circuits.

13. The GPU of claim 12, wherein the electronic circuits include switches configured to: selectively electrically connect the two buffers and the two computing circuits, and selectively electrically connect two or more of the processing cores via the interconnect lines for performing at least a portion of a graphic function.

14. A method of parallel processing of image data, comprising:
moving image data representing at least part of an image from a memory to a memory graphics processing unit (GPU), the memory GPU comprising a plurality of processing cores, and each of the processing cores comprising a plurality of bit processing cores each configured to process an individual bit of a pixel, each of the bit processing cores comprising internal circuits;
processing the image data to perform a graphic function including a plurality of processing tasks on different parts of the image data in parallel within the memory GPU, the processing tasks comprising different binary operations, and performing the different binary operations comprises:
performing one of the different binary operations on the individual bit of the pixel by selectively connecting: i) two of the processing cores together via one or more address lines and ii) two or more of the internal circuits of one of the processing cores together, and storing a result of the one of the different binary operations in a buffer; and
moving the processed image data from the memory GPU to the memory.

15. The method of claim 14, wherein the graphic function is performed without moving the image data outside of the memory GPU.

16. The method of claim 14, wherein the different parts of the image data each correspond to a respective individual pixel of the image data.

17. The method of claim 14, wherein the processing cores are configured to provide a complete basis of binary operations used to implement any processing task through a sequence of operations from the basis.

18. The method of claim 17, wherein the binary operations comprise copy, reset, shift, addition, and not.

19. The method of claim 17, wherein the internal circuits of each of the bit processing cores includes two buffers and two computing circuits.

20. The GPU of claim 1, wherein the bit processing cores are further configured to provide a complete basis of binary operations via the selective connection.

21. The GPU of claim 1, wherein the internal circuits of the bit processing cores include a memory gate configured to switch between a conductive state and a non-conductive state based on a direction of a voltage applied between terminals of the memory gate.

* * * * *